(12) United States Patent
Tseng

(10) Patent No.: US 9,948,142 B2
(45) Date of Patent: Apr. 17, 2018

(54) SYSTEM FOR AND METHOD OF WIRELESS CHARGING OF A DEVICE

(71) Applicant: TAIWAN SEMICONDUCTOR MANUFACTURING COMPANY, LTD., Hsinchu (TW)

(72) Inventor: Chien-Chung Tseng, Zhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 668 days.

(21) Appl. No.: 14/580,961

(22) Filed: Dec. 23, 2014

(65) Prior Publication Data

US 2016/0094075 A1    Mar. 31, 2016

Related U.S. Application Data

(60) Provisional application No. 62/057,597, filed on Sep. 30, 2014.

(51) Int. Cl.
*H02J 50/10* (2016.01)
*H02J 7/00* (2006.01)

(52) U.S. Cl.
CPC ............ *H02J 50/10* (2016.02); *H02J 7/0042* (2013.01)

(58) Field of Classification Search
CPC ...... H02J 7/00; H02J 7/02; H02J 7/025; H02J 7/007
USPC .......................................................... 307/104
See application file for complete search history.

(56) References Cited

U.S. PATENT DOCUMENTS

2014/0347007 A1* 11/2014 Kee .................. H02J 7/025
320/108

* cited by examiner

*Primary Examiner* — Robert Deberadinis
(74) *Attorney, Agent, or Firm* — Hauptman Ham, LLP

(57) ABSTRACT

A wireless charging system including a first coil configured to be coupled to a transmitter driver circuit and arranged in a first plane, a second coil configured to be coupled to the transmitter driver circuit and arranged in a second plane and a third coil configured to be coupled to the transmitter driver circuit and arranged in a third plane. The transmitter driver circuit is configured to provide a time-varying current signal to one or more of the first coil, the second coil or the third coil. The first coil, the second coil and the third coil are concentric, the first plane is not parallel to the second plane and the third plane, and the second plane is not parallel to the third plane.

20 Claims, 14 Drawing Sheets

SYSTEM FOR AND METHOD OF WIRELESS CHARGING OF A DEVICE

BACKGROUND

Wireless power or wireless energy transmission is the transmission of electrical energy from a power source to a receiver by a wireless transmission link. The receiver has an electrical load and the load is electrically charged from the received electrical energy.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
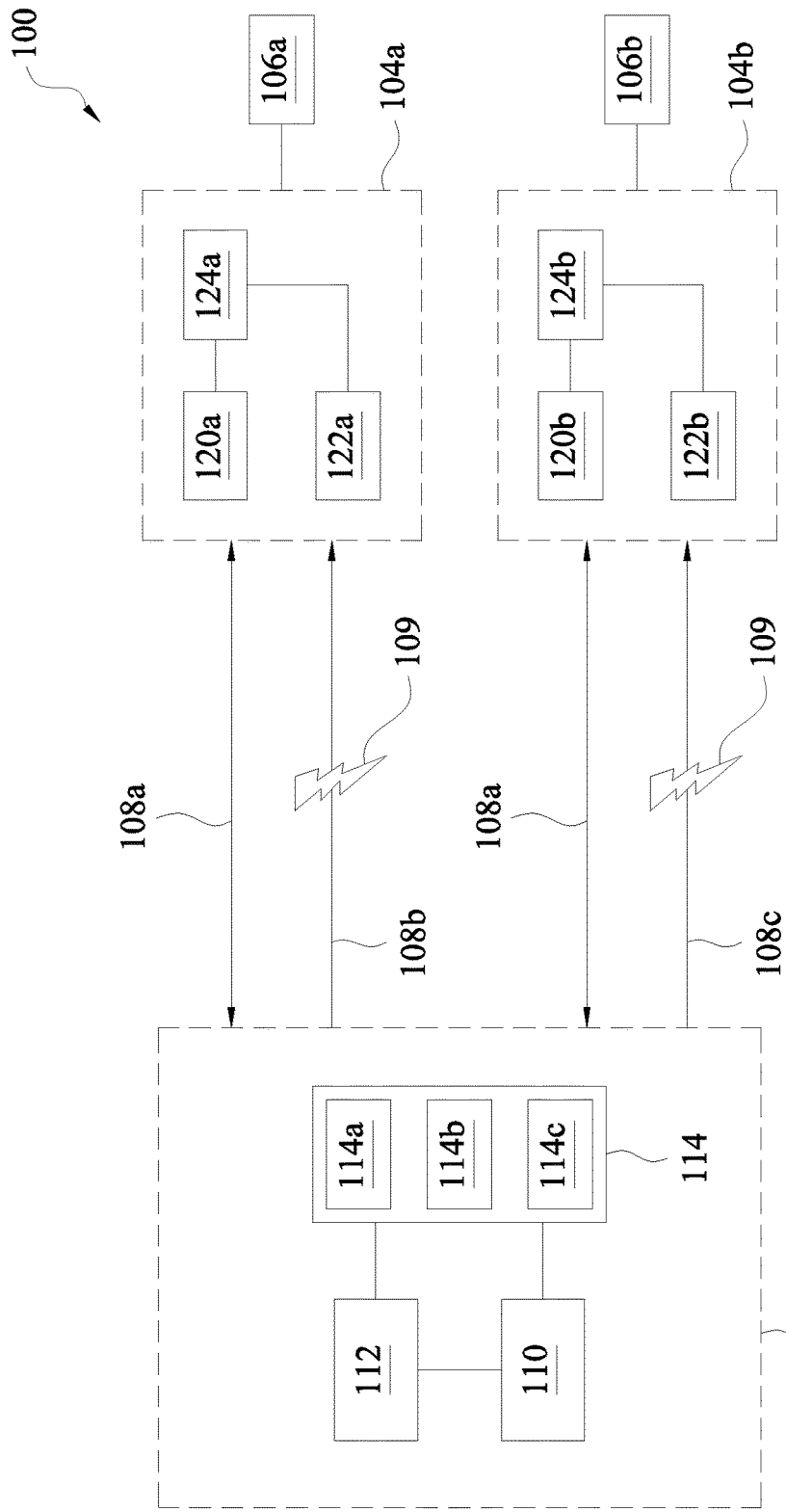
FIG. 1 is a block diagram of a portion of a wireless charging system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a wireless charging system includes a first coil configured to be coupled to a transmitter driver circuit and arranged in a first plane, a second coil configured to be coupled to the transmitter driver circuit and arranged in a second plane and a third coil configured to be coupled to the transmitter driver circuit and arranged in a third plane. In some embodiments, the transmitter driver circuit is configured to provide a time-varying current signal to one or more of the first coil, the second coil or the third coil. In some embodiments, the first coil, the second coil and the third coil are concentric. In some embodiments, the first plane is not parallel to both the second plane and the third plane. In some embodiments, the second plane is not parallel to the third plane.

FIG. 1 is a block diagram of a portion of a wireless charging system 100 in accordance with one or more embodiments. Wireless charging system 100 comprises a transmitter 102, a first receiver 104a, a second receiver 104b and two loads 106a and 106b.

One or both of first and second receiver 104a, 104b communicate with transmitter 102 by radio link 108a and request the transmitter 102 to transmit power to one or both of first and second receiver 104a, 104b. Transmitter 102 wirelessly transmits power by power link 108b to first receiver 104a, which in turn, supplies the received power to a corresponding load 106a. In some embodiments, transmitter 102 wirelessly transmits power by power link 108c to second receiver 104b, which in turn, supplies the received power to a corresponding load 106b. In some embodiments, one or both of first and second receiver 104a, 104b communicate with transmitter 102 by radio link 108a to request the transmitter 102 to stop the transmission of power to one or both of first and second receiver 104a, 104b. Transmitter 102 stops the transmission of power to one or both of first and second receiver 104a, 104b.

Transmitter 102 is configured to communicate with first receiver 104a by radio link 108a. In some embodiments, radio link 108a is a wireless link. Radio link 108a is a bidirectional link. In some embodiments, power link 108b or 108c is a unidirectional link. Transmitter 102 is configured to send and receive data to/from first receiver 104a by radio link 108a. Transmitter 102 is configured to send power signal 109 to first receiver 104a by power link 108b. In some embodiments, transmitter 102 is configured to communicate with first receiver 104a by one or more antennas (not shown) over radio link 108a. In some embodiments, power signal 109 is a near-field magnetic resonance signal which is subsequently processed to provide electrical power to load 106a or load 106b.

Transmitter 102 is configured to communicate with second receiver 104b by radio link 108a. Transmitter 102 is configured to send and receive data to/from second receiver 104b by radio link 108a. In some embodiments, transmitter 102 and second receive 104b communicate using a different radio link from radio link 108a. Transmitter 102 is configured to send power signal 109 to second receiver 104b by power link 108c. In some embodiments, transmitter 102 is configured to communicate with second receiver 104b by one or more antennas (not shown) over radio link 108a.

In some embodiments, the wireless data communication between transmitter 102 and first receiver 104a or second receiver 104b over radio link 108a conforms to the Bluetooth or the like wireless standard.

Transmitter 102 comprises a controller 110, a driver circuit 112 and one or more coils.

Controller 110 is communicably connected with driver circuit 112 and one or more coils 114. In some embodiments, controller 110 is electrically connected with driver circuit 112 and/or one or more coils 114. In some embodiments, controller 110 is a processor (shown as processor 1010 in FIG. 10) or similar device for executing a set of instructions. Controller 110 is configured to control operation of transmitter 102. In some embodiments, controller 110 is configured to control driver circuit 112 or one or more coils 114. In some embodiments, controller 110 is configured to control the wireless communication with first receiver 104a and/or second receiver 104b over radio link 108a or power link 108b or 108c. In some embodiments, the number of coils in one or more coils 114 (e.g., first coil 114a, second coil 114b or third coil 114c) are varied for the transmission of power signal 109. In some embodiments, controller 110 is configured to select the number of coils in one or more coils 114 (e.g., first coil 114a, second coil 114b or third coil 114c) used in the transmission of power signal 109. In some embodiments, controller 110 is configured to send one or more control signals (e.g., control signal S1, S2, S3, S4, S5 or S6 shown in FIGS. 5A-5B) to driver circuit 112 which selects the number of coils in one or more coils 114 (e.g., first coil 114a, second coil 114b or third coil 114c) used in the transmission of power signal 109.

Driver circuit 112 is communicably connected with controller 110 and one or more coils 114. In some embodiments, driver circuit 112 is electrically connected with controller 110 and/or one or more coils 114. Driver circuit 112 is configured to receive a control signal (e.g., control signal S1, S2, S3, S4, S5 or S6 shown in FIGS. 5A-5B) from controller 110 which identifies which coils (e.g., first coil 114a, second coil 114b or third coil 114c) are selected for the transmission of power signal 109. In some embodiments, driver circuit 112 is configured to select and activate which coils (e.g., first coil 114a, second coil 114b or third coil 114c) are used in the transmission of power signal 109. Driver circuit 112 is configured to provide a time-varying/alternating current (AC) signal to one or more coils 114. In some embodiments, the AC signal activates a corresponding coil element (e.g., first coil 114a, second coil 114b or third coil 114c) within one or more coils 114. In some embodiments, the AC signal includes a resonance frequency, and the resonance frequency of the AC signal is substantially equal to the resonance frequency of the corresponding coil element (e.g., first coil 114a, second coil 114b or third coil 114c). In some embodiments, driver circuit 112 is integrated with controller 110.

One or more coils 114 are communicably connected with controller 110 and driver circuit 112. In some embodiments, one or more coils 114 are electrically connected with controller 110 and/or driver circuit 112. One or more coils 114 are controlled by driver circuit 112 or controller 110. One or more coils 114 are configured to receive the AC signal from driver circuit 112 and to produce a magnetic field (which corresponds to power signal 109 sent by transmitter 102). In some embodiments, one or more coils 114 are tuned to resonate at the frequency of the AC signal (e.g., resonance frequency). In some embodiments, one or more coils 114 are configured to generate a near-field magnetic resonance signal at the resonance frequency.

One or more coils 114 comprises a first coil 114a, a second coil 114b and a third coil 114c.

In some embodiments, if a coil element (e.g., first coil 114a, second coil 114b or third coil 114c) within one or more coils 114 receives the AC signal from driver circuit 112, the corresponding coil element (e.g., first coil 114a, second coil 114b or third coil 114c) is activated such that a magnetic field (which corresponds to power signal 109 sent by transmitter 102) is generated. In some embodiments, one or more of the coils 114 (e.g., first coil 114a, second coil 114b or third coil 114c) are activated.

In some embodiments, first, second, or third coil 114a, 114b, 114c is configured to send power signal 109 to a single receiver (e.g., first receiver 104a or second receiver 104b). In some embodiments, first, second, or third coil 114a, 114b, 114c is configured to send power signal 109 to multiple receivers (e.g., first receiver 104a and second receiver 104b).

In some embodiments, first coil 114a, second coil 114b or third coil 114c resonate at a same frequency. In some embodiments, first coil 114a, second coil 114b and third coil 114c have a same physical structure. In some embodiments, a diameter of each of the one or more coils 114 (e.g., first coil 114a, second coil 114b and third coil 114c) are substantially the same. Although FIG. 1 illustrates one or more coils 114 include three coils (e.g., first coil 114a, second coil 114b and third coil 114c), alternative embodiments include one or more coils 114 comprising a single coil or more than three coils, consistent with the teachings disclosed herein.

First receiver 104a is electrically connected to load 106a. First receiver 104a is configured to send and receive data by radio link 108a. First receiver 104a is configured to receive power signal 109 by power link 108b. Receiver 104a is configured to process power signal 109, and delivers an electrical power signal to load 106a. In some embodiments, the electrical power signal provides electrical power to load 106a. In some embodiments, load 106a is a separate electronic device, a storage element or a battery of the electronic device. In some embodiments, first receiver 104a is integrated with load 106a.

First receiver 104a comprises a first receiver coil 120a, a first receiver controller 122a and a first receiver circuit 124a. First receiver coil 120a and first receiver controller 122a are both connected with first receiver circuit 124a.

First receiver coil 120a is configured to receive power signal 109 from transmitter 102. In some embodiments, first receiver coil 120a is configured to receive power signal 109 from a single transmitting coil (e.g., first coil 114a or second coil 114b or third coil 114c). In some embodiments, first receiver coil 120a is configured to receive power signal 109 from multiple transmitting coils (e.g., first coil 114a, second coil 114b and third coil 114c).

First receiver controller 122a is communicably connected with first receiver circuit 124a. In some embodiments, first receiver controller 122a is electrically connected with first receiver controller 122a. First receiver controller 122a is configured to control operation of first receiver 104a. In some embodiments, first receiver controller 122a is configured to control the wireless communication with transmitter 102 over radio link 108a or power link 108b. In some embodiments, first receiver controller 122a is configured to send and receive control signals (described in FIG. 8) to/from the transmitter 102. In some embodiments, first receiver controller 122a is a processor (e.g., shown as processor 1010 in FIG. 10) or a similar device for executing a set of instructions.

First receiver circuit 124a is communicably connected with first receiver controller 122a and first receiver coil 120a. In some embodiments, first receiver circuit 124a is electrically connected with first receiver controller 122a and/or first receiver coil 124a. First receiver circuit 124a is configured to receive power signal 109 from first receiver coil 120a. In some embodiments, first receiver circuit 124a is configured to rectify and condition power signal 109. In some embodiments, first receiver circuit 124a includes a rectifier (not shown) and a voltage conditioner (not shown). First receiver circuit 124a is configured to deliver an electrical power signal to load 106a. In some embodiments, the electrical power signal is a direct current (DC) signal.

Second receiver 104b is an embodiment of first receiver 104a and includes similar elements. In some embodiments, second receiver 104b includes each of the features described for first receiver 104a. Second receiver 104b is electrically connected to load 106b. Second receiver Second receiver 104b is configured to receive power signal 109 by power link 108c. Second receiver 104b is configured to process power signal 109, and delivers an electrical power signal to load 106b. In some embodiments, the electrical power signal provides electrical power to load 106b. In some embodiments, load 106b is a separate electronic device, a storage element or a battery of the electronic device. In some embodiments, second receiver 104b is integrated with load 106b.

In some embodiments, transmitter 102 is configured to deliver power 109 from a multi-angle direction. In some embodiments, transmitter 102 is configured to deliver power 109 from an omnidirectional system.

Although FIG. 1 illustrates two receivers (e.g., first receiver 104a and second receiver 104b), alternative embodiments include a single receiver or more than two receivers consistent with the teachings disclosed herein.

Figure 2:
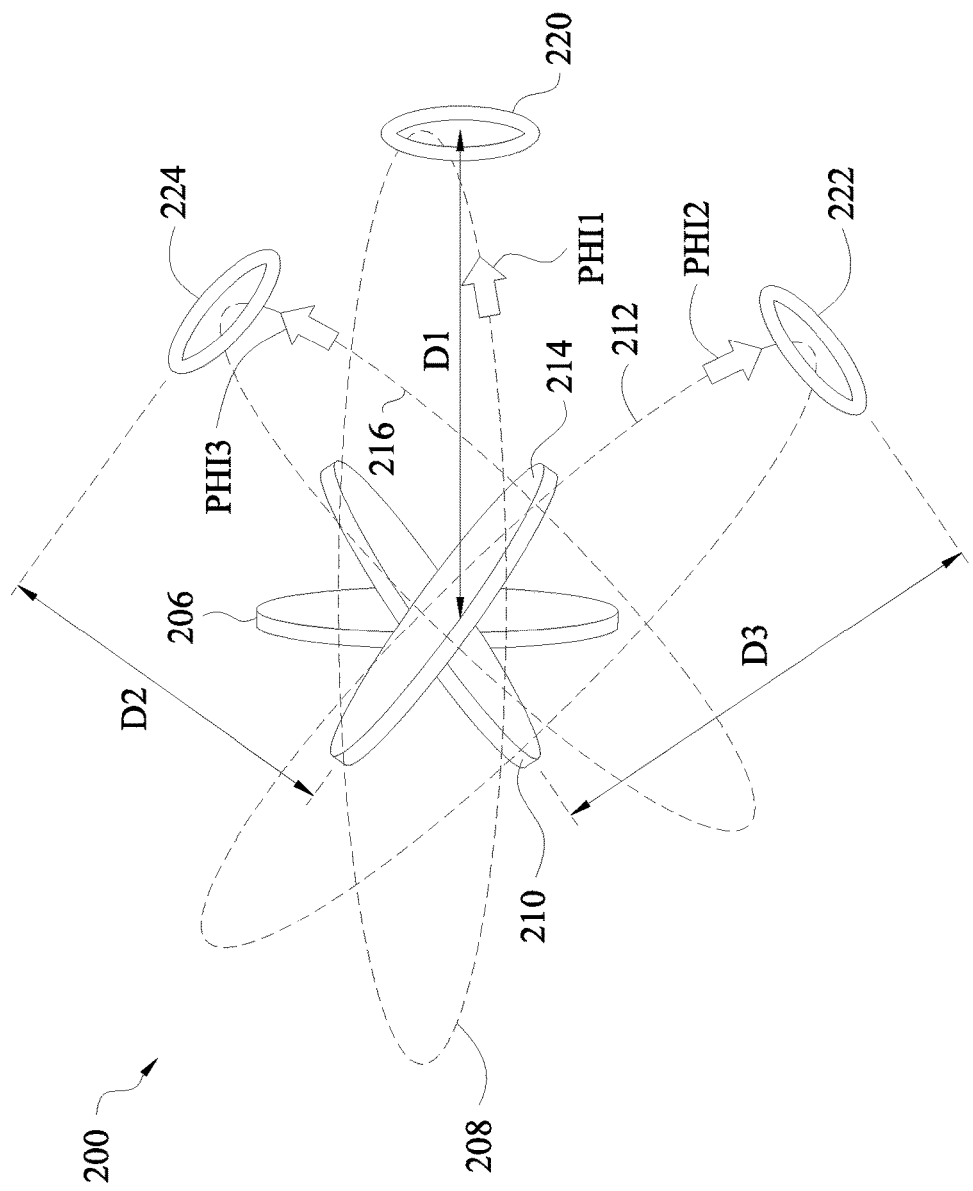
FIG. 2 is a schematic diagram of a portion of a coil system in accordance with one or more embodiments.

FIG. 2 is a schematic diagram of a portion of one or more coils 200 in accordance with one or more embodiments. One or more coils 200 is an embodiment of wireless charging system 100 shown in FIG. 1. First coil 206 is an embodiment of first coil 114a shown in FIG. 1 with similar elements. Second coil 210 is an embodiment of second coil 114b shown in FIG. 1 with similar elements. Third coil 214 is an embodiment of third coil 114c shown in FIG. 1 with similar elements. Fourth coil 220 is an embodiment of first receiver coil 120a shown in FIG. 1 with similar elements. Fifth coil 222 is an embodiment of second receiver coil 120b shown in FIG. 1 with similar elements. Sixth coil 224 is an embodiment of first receiver coil 120a shown in FIG. 1 with similar elements. In comparison with FIG. 1, FIG. 2 does not include loads 106a or 106b, controller 110, driver circuit 112, first receiver controller 122a, second receiver controller 122b, first receiver circuit 124a and second receiver circuit 124b for clarity. In some embodiments, each of the transmitting coils (e.g., first coil 206, second coil 210 and third coil 214) shown in FIG. 2 are active, and are configured to generate a corresponding magnetic field (e.g., first magnetic field 208, second magnetic field 212 and third magnetic field 216) which are utilized to deliver power signal 109 to the receiver coils (e.g., fourth coil 220, fifth coil 222 and sixth coil 224).

First coil 206 is configured to receive an AC signal and to generate first magnetic field 208 (which corresponds to power signal 109 sent by transmitter 102 shown in FIG. 1). In some embodiments, first coil 206 is arranged to resonate at a frequency of the received AC signal (e.g., resonance frequency F1). In some embodiments, first magnetic field 208 is a near-field magnetic resonance signal at first resonance frequency F1. In some embodiments, first coil 206 includes one or more wire loops. In some embodiments, the one or more wire loops comprise a conductive material. In some embodiments, first coil 206 is an air core coil. In some embodiments, as the inductance of first coil 206 is increased, the switching frequency and the switching loss of the first coil 206 are reduced.

First coil 206 is separated a distance D1 from fourth coil 220.

First coil 206 is arranged in a first plane (not shown). In some embodiments, first coil 206 and fourth coil 220 are arranged in the same plane (e.g., first plane). In some embodiments, a center of first coil 206 is substantially aligned with a center of fourth coil 220. In some embodiments, a center of first coil 206 is substantially aligned with a center of fourth coil 220 if a line segment that is substantially normal to each coil (e.g., first coil 206 and fourth coil 220) also intersects the center of each coil (e.g., first coil 206 and fourth coil 220). In some embodiments, the amount of power delivered (e.g., power signal 109) to fourth coil 220 (from first coil 206) is increased (when compared with other arrangements) by substantially aligning the center of first coil 206 with the center of fourth coil 220, and arranging first coil 206 and fourth coil 220 in the same plane (e.g. a face-to-face configuration).

In some embodiments, if first coil 206 is not arranged in a similar orientation (e.g., same plane or alignment of the centers of each coil) as fifth coil 222 or sixth coil 224, power is still delivered to fifth coil 222 or sixth coil 224, but an amount of power delivered to fifth coil 222 or sixth coil 224 is less than if the fifth coil 222 or sixth coil 224 is arranged in a similar orientation (e.g., same plane or alignment of the centers of each coil). In some embodiments, the first coil 206 overlaps the fourth coil 220, the fifth coil 222 or the sixth coil 224. In some embodiments, first coil 206 is configured to deliver power to fourth coil 220, fifth coil 222 or sixth coil 224, if a center of first coil 206 is substantially aligned with a center of fourth coil 220, fifth coil 222 or sixth coil 224.

In some embodiments, a diameter of first coil 206 is substantially equal to a diameter of second coil 210 or third coil 214. In some embodiments, a diameter of first coil 206 is substantially equal to a diameter of fourth coil 220, fifth coil 222 or sixth coil 224.

Second coil 210 is configured to receive an AC signal and to generate second magnetic field 212 (which corresponds to power signal 109 sent by transmitter 102 shown in FIG. 1). In some embodiments, second coil 210 is arranged to resonate at a frequency of the received AC signal (e.g., second resonance frequency F2). In some embodiments, second magnetic field 212 is a near-field magnetic resonance signal with second resonance frequency F2. In some embodiments, second coil 210 includes one or more wire loops. In some embodiments, the one or more wire loops comprise a conductive material. In some embodiments, second coil 210 is an air core coil. In some embodiments, as the inductance of second coil 210, the switching frequency and the switching loss of the second coil 210 are reduced.

Second coil 210 is separated a distance D2 from fifth coil 222.

Second coil 210 is arranged in a second plane (not shown). In some embodiments, second coil 210 and fifth coil 222 are arranged in the same plane (e.g., second plane). In some embodiments, a center of second coil 210 is substantially aligned with a center of fifth coil 222. In some embodiments, a center of second coil 210 is substantially aligned with a center of fifth coil 222 if a line segment that is substantially normal to each coil (e.g., second coil 210 and fifth coil 222) also intersects the center of each coil (e.g., second coil 210 and fifth coil 222). In some embodiments, the amount of power delivered (e.g., power signal 109) to fifth coil 222 (from second coil 210) is increased (when compared with other arrangements) by substantially aligning the center of second coil 210 with the center of fifth coil 222, and arranging second coil 210 and fifth coil 222 in the same plane (e.g. a face-to-face configuration).

In some embodiments, if second coil 210 is not arranged in a similar orientation (e.g., same plane or alignment of the centers of each coil) as fourth coil 220 or sixth coil 224, power is still delivered to fourth coil 220 or sixth coil 224, but an amount of power delivered to fourth coil 220 or sixth coil 224 is less than if the fourth coil 220 or sixth coil 224 is arranged in a similar orientation (e.g., same plane or alignment of the centers of each coil). In some embodiments, second coil 210 overlaps fourth coil 220, fifth coil 222 or sixth coil 224. In some embodiments, second coil 210 is configured to deliver power to fourth coil 220, fifth coil 222 or sixth coil 224, if a center of second coil 210 is substantially aligned with a center of fourth coil 220, fifth coil 222 or sixth coil 224.

In some embodiments, a diameter of second coil 210 is substantially equal to a diameter of first coil 206 or third coil 214. In some embodiments, a diameter of second coil 210 is substantially equal to a diameter of fourth coil 220, fifth coil 222 or sixth coil 224.

Third coil 214 is configured to receive an AC signal and to generate a third magnetic field 216 (which corresponds to the power signal 109 sent by transmitter 102 shown in FIG. 1). In some embodiments, the third coil 214 is arranged to resonate at a frequency of the received AC signal (e.g., third resonance frequency F3). In some embodiments, the third magnetic field 216 is a near-field magnetic resonance signal with a third resonance frequency F3. In some embodiments, the third coil 214 includes one or more wire loops. In some embodiments, the one or more wire loops comprise a conductive material. In some embodiments, the third coil 214 is an air core coil. In some embodiments, as the inductance of the third coil 214 is increased, the switching frequency and the switching loss of the third coil 214 are reduced.

Third coil 214 is separated a distance D3 from the sixth coil 224.

Third coil 214 is arranged in a third plane (not shown). In some embodiments, third coil 214 and sixth coil 224 are arranged in the same plane (e.g., second plane). In some embodiments, a center of third coil 214 is substantially aligned with a center of sixth coil 224. In some embodiments, a center of third coil 214 is substantially aligned with a center of sixth coil 224 if a line segment that is substantially normal to each coil (e.g., third coil 214 and sixth coil 224) also intersects the center of each coil (e.g., third coil 214 and sixth coil 224). In some embodiments, the amount of power delivered (e.g., power signal 109) to sixth coil 224 (from third coil 214) is increased (when compared with other arrangements) by substantially aligning the center of third coil 214 with the center of sixth coil 224, and arranging third coil 214 and sixth coil 224 in the same plane (e.g. a face-to-face configuration).

In some embodiments, if third coil 214 is not arranged in a similar orientation (e.g., same plane or alignment of the centers of each coil) as fourth coil 220 or fifth coil 222, power is still delivered to fourth coil 220 or fifth coil 222, but an amount of power delivered to fourth coil 220 or fifth coil 222 is less than if the fourth coil 220 or fifth coil 222 is arranged in a similar orientation (e.g., same plane or alignment of the centers of each coil). In some embodiments, third coil 214 overlaps fourth coil 220, fifth coil 222 or sixth coil 224. In some embodiments, third coil 214 is configured to deliver power to fourth coil 220, fifth coil 222 or sixth coil 224, if a center of third coil 214 is substantially aligned with a center of fourth coil 220, fifth coil 222 or sixth coil 224.

In some embodiments, a diameter of third coil 214 is substantially equal to a diameter of first coil 206 or second coil 210. In some embodiments, a diameter of third coil 214 is substantially equal to a diameter of fourth coil 220, fifth coil 222 or sixth coil 224.

In some embodiments, first coil 206, second coil 210 and third coil 214 are concentric. In some embodiments, a center of first coil 206 is substantially aligned with a center of second coil 210 and a center of third coil 214. In some embodiments, the first plane is offset from the second plane or the third plane by 120 degrees. In some embodiments, the second plane is offset from the first plane or the third plane by 120 degrees. In some embodiments, the first plane intersects the second plane or the third plane, and an angle between the first plane and the second plane or the third plane is about 120 degrees. In some embodiments, the second plane intersects the first plane or the third plane, and an angle between the second plane and the first plane or the third plane is about 120 degrees. In some embodiments, the third plane intersects the first plane or the second plane, and an angle between the third plane and the first plane or the second plane is about 120 degrees. In some embodiments, the first plane is not parallel to the second plane or the third plane. In some embodiments, the second plane is not parallel to the first plane or the third plane. In some embodiments, first coil 206, second coil 210 and third coil 214 are configured to generate a multi-directional magnetic field (e.g., magnetic fields 208, 212 and 216). In some embodiments, first coil 206, second coil 210 and third coil 214 are configured to generate a substantially omni-directional magnetic field (e.g., magnetic fields 208, 212 and 216).

In some embodiments, first resonance frequency F1 is substantially equal to second resonance frequency F2 or third resonance frequency F3. In some embodiments, second resonance frequency F2 is substantially equal to first resonance frequency F1 or third resonance frequency F3.

Fourth coil 220 is configured to receive first magnetic field 208 from first coil 206 (by first magnetic flux PHI1). In some embodiments, first magnetic flux PHI1 is first magnetic field 208 incident upon fourth coil 220. From Faraday's law of induction, a change in the magnetic flux (e.g., first magnetic flux PHI1 second magnetic flux PHI2 or third magnetic flux PHI3) passing through fourth coil 220 will cause an electromotive force, and a corresponding electric current in fourth coil 220. In some embodiments, fourth coil 220 is configured to receive second magnetic field 212 from second coil 210 (by second magnetic flux PHI2). In some embodiments, fourth coil 220 is configured to receive third magnetic field 216 from third coil 214 (by third magnetic flux PHI3).

In some embodiments, fourth coil 220 is arranged to resonate at first resonance frequency F1. In some embodiments, fourth coil 220 includes one or more wire loops. In some embodiments, the one or more wire loops comprise a conductive material. In some embodiments, fourth coil 220 is an air core coil. In some embodiments, as the inductance of fourth coil 220 is increased, the switching frequency and the switching loss of the fourth coil 220 are reduced.

In some embodiments, fourth coil 220 is arranged in a fourth plane (not shown). In some embodiments, the fourth plane (not shown) is parallel to the first plane (not shown). In some embodiments, a diameter of fourth coil 220 is substantially equal to a diameter of first coil 206, fifth coil 222 or sixth coil 224. In some embodiments, first magnetic flux PHI1 through fourth coil 220 is increased (when compared with other arrangements) by substantially aligning the center of first coil 206 with the center of fourth coil 220, or arranging first coil 206 and fourth coil 220 in the same plane (e.g. a face-to-face configuration).

Fifth coil 222 is configured to receive second magnetic field 212 from second coil 210 (by second magnetic flux PHI2). In some embodiments, second magnetic flux PHI2 is second magnetic field 212 incident upon fifth coil 222. From Faraday's law of induction, a change in the magnetic flux (e.g., first magnetic flux PHI1, second magnetic flux PHI2 or third magnetic flux PHI3) passing through fifth coil 222 will cause an electromotive force, and a corresponding electric current in fifth coil 222. In some embodiments, fifth coil 222 is configured to receive first magnetic field 208 from first coil 206 (by first magnetic flux PHI1). In some embodiments, fifth coil 222 is configured to receive third magnetic field 216 from third coil 214 (by third magnetic flux PHI3).

In some embodiments, fifth coil 222 is arranged to resonate at second resonance frequency F2. In some embodiments, fifth coil 222 includes one or more wire loops. In some embodiments, the one or more wire loops comprise a conductive material. In some embodiments, fifth coil 222 is an air core coil. In some embodiments, as the inductance of fifth coil 222 is increased, the switching frequency and the switching loss of the fifth coil 222 are reduced.

In some embodiments, fifth coil 222 is arranged in a fifth plane (not shown). In some embodiments, the fifth plane (not shown) is parallel to the second plane (not shown). In some embodiments, a diameter of fifth coil 222 is substantially equal to a diameter of second coil 210, fourth coil 220 or sixth coil 224. In some embodiments, second magnetic flux PHI2 through fifth coil 222 is increased (when compared with other arrangements) by substantially aligning the center of second coil 210 with the center of fifth coil 222, or arranging second coil 210 and fifth coil 222 in the same plane (e.g. a face-to-face configuration).

Sixth coil 224 is configured to receive third magnetic field 216 from third coil 214 (by third magnetic flux PHI3). In some embodiments, third magnetic flux PHI3 is third magnetic field 216 incident upon sixth coil 224. From Faraday's law of induction, a change in the magnetic flux (e.g., first magnetic flux PHI1 second magnetic flux PHI2 or third magnetic flux PHI3) passing through sixth coil 224 will cause an electromotive force, and a corresponding electric current in sixth coil 224. In some embodiments, sixth coil 224 is configured to receive first magnetic field 208 from first coil 206 (by first magnetic flux PHI1). In some embodiments, sixth coil 224 is configured to receive second magnetic field 212 from second coil 210 (by second magnetic flux PHI2).

In some embodiments, sixth coil 224 is arranged to resonate at third resonance frequency F3. In some embodiments, sixth coil 224 includes one or more wire loops. In some embodiments, the one or more wire loops comprise a conductive material. In some embodiments, sixth coil 224 is an air core coil. In some embodiments, as the inductance of sixth coil 224 is increased, the switching frequency and the switching loss of the sixth coil 224 are reduced.

In some embodiments, sixth coil 224 is arranged in a sixth plane (not shown). In some embodiments, the sixth plane (not shown) is parallel to the third plane (not shown). In some embodiments, a diameter of sixth coil 224 is substantially equal to a diameter of third coil 214, fourth coil 220 or fifth coil 222. In some embodiments, third magnetic flux PHI3 through sixth coil 224 is increased (when compared with other arrangements) by substantially aligning the center of third coil 214 with the center of sixth coil 224, or arranging third coil 214 and sixth coil 224 in the same plane (e.g. a face-to-face configuration).

In some embodiments, first coil 206, second coil 210 and third coil 214 are configured to deliver power signal 109 from a multi-angle direction. In some embodiments, first coil 206, second coil 210 and third coil 214 are configured to receive power signal 109 as an omnidirectional coil element.

In some embodiments, first coil 206, second coil 210, third coil 214, fourth coil 220, fifth coil 222 or sixth coil 224 are arranged to comply with the Rezence™, Qi™, or the Power Matters Alliance (PMA) interface standard. Although FIG. 2 illustrates three receiver coils (e.g., fourth coil 220, fifth coil 222 and sixth coil 224), alternative embodiments include a single receiver or more than three receivers consistent with the teachings disclosed herein. Although FIG. 2 illustrates three transmitter coils (e.g., first coil 206, second coil 210 and third coil 214), alternative embodiments include more than three transmitter coils consistent with the teachings disclosed herein.

Figure 3:
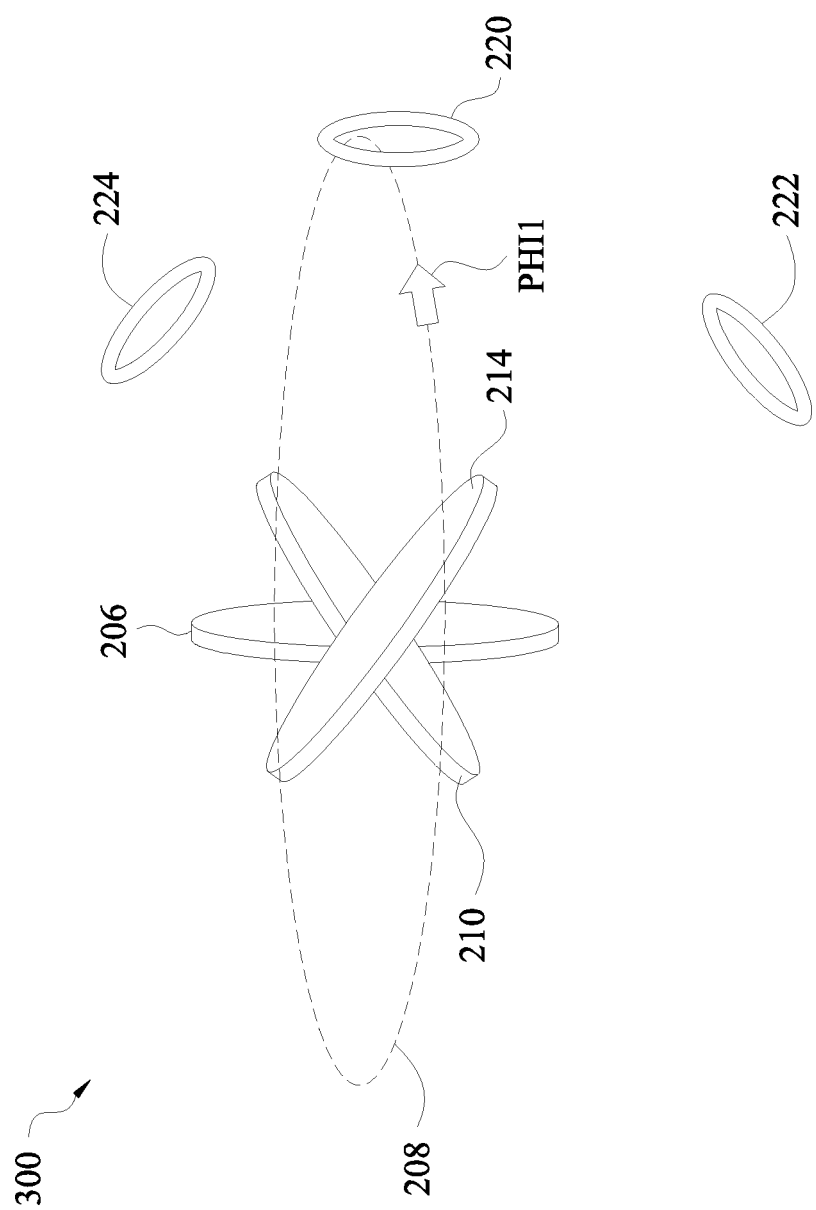
FIG. 3 is a schematic diagram of a portion of a coil system in accordance with one or more embodiments.

FIG. 3 is a schematic diagram of a portion of one or more coils 300 in accordance with one or more embodiments. One or more coils 300 are an embodiment of wireless charging system 100 shown in FIG. 1 with similar elements. One or more coils 300 are an embodiment of one or more coils 200 shown in FIG. 2 with similar elements. In comparison with FIG. 2, one or more coils 300 of FIG. 3 shows that a single transmitting coil (e.g., first coil 206) is active, and generates a corresponding magnetic field (e.g., first magnetic field 208) which is utilized to deliver power 109 to one or more of the receiver coils (e.g., fourth coil 220, fifth coil 222 or sixth coil 224). In some embodiments, the number of transmitting coils (e.g., first coil 206, second coil 210 or third coil 214) activated is adjusted to deliver power 109 to one or more of the receiver coils (e.g., fourth coil 220, fifth coil 222 or sixth coil 224). In some embodiments, the number of transmitting coils (e.g., first coil 206, second coil 210 or third coil 214) activated is based upon the position of the receiving coils (e.g., fourth coil 220, fifth coil 222 or sixth coil 224). For example, in some embodiments, if one or more receiver coils (e.g., fourth coil 220, fifth coil 222 or sixth coil 224) are positioned such that the amount of power transferred to the one or more receiving coils (e.g., fourth coil 220, fifth coil 222 or sixth coil 224) is increased by activating multiple transmitting coils (e.g., first coil 206, second coil 210 or third coil 214), then multiple transmitting coils (e.g., first coil 206, second coil 210 or third coil 214)

are activated. In some embodiments, the number of transmitting coils (e.g., first coil 206, second coil 210 or third coil 214) activated is based upon the distance between the transmitting coil (e.g., first coil 206, second coil 210 or third coil 214) and the receiving coil (e.g., fourth coil 220, fifth coil 222 or sixth coil 224). In some embodiments, the number of coils activated is based upon the orientation of the transmitting coil (e.g., first coil 206, second coil 210 or third coil 214) or the orientation of the receiving coil (e.g., fourth coil 220, fifth coil 222 or sixth coil 224).

Figure 4:
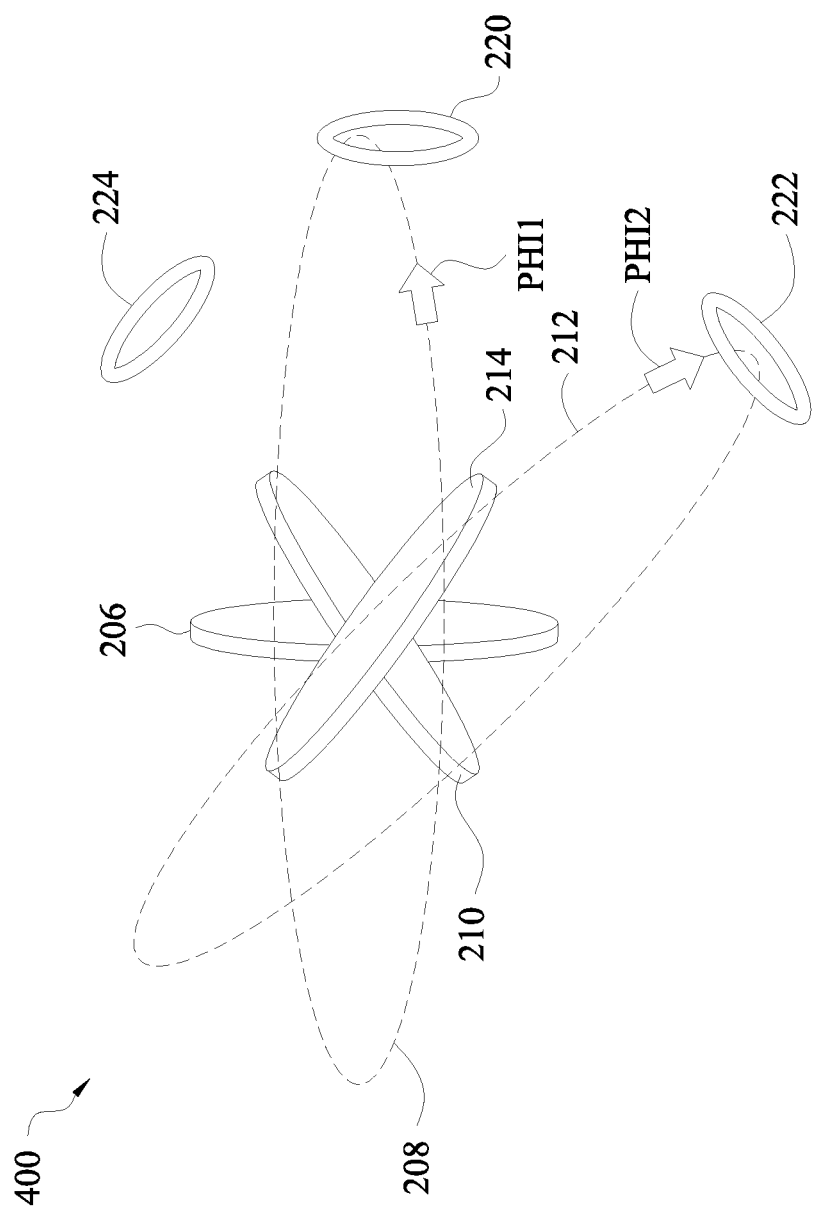
FIG. 4 is a schematic diagram of a portion of a coil system in accordance with one or more embodiments.

FIG. 4 is a schematic diagram of a portion of one or more coils 400 in accordance with one or more embodiments. One or more coils 400 are an embodiment of wireless charging system 100 shown in FIG. 1 with similar elements. One or more coils 400 are an embodiment of one or more coils 200 shown in FIG. 2 with similar elements. One or more coils 400 are an embodiment of one or more coils 300 shown in FIG. 3 with similar elements. In comparison with FIG. 2, one or more coils 400 of FIG. 4 shows that two transmitting coils (e.g., first coil 206 and second coil 210) are active, and each generate a corresponding magnetic field (e.g., first magnetic field 208 and second magnetic field 212) which are utilized to deliver power signal 109 to one or more of the receiver coils (e.g., fourth coil 220, fifth coil 222 or sixth coil 224).

In some embodiments, by dynamically adjusting the number of activated, transmitting coils (e.g., first coil 206, second coil 210 or third coil 214), the corresponding magnetic field (e.g., first magnetic field 208, second magnetic field 212 or third magnetic field 216) generated by each coil is also adjusted and allows for multi-directional power transfer to one or more receiver coils (e.g., fourth coil 220, fifth coil 222 or sixth coil 224) oriented in varied positions.

In some embodiments, transmitting coil (e.g., first coil 206) is activated, and generates a corresponding magnetic field (e.g., first magnetic field 208) which is utilized to deliver power signal 109 to one or more of the receiver coils (e.g., fourth coil 220 or sixth coil 224). In some embodiments, transmitting coil (e.g., second coil 210) is activated, and generates a corresponding magnetic field (e.g., second magnetic field 212) which is utilized to deliver power signal 109 to one or more of the receiver coils (e.g., fifth coil 222 or sixth coil 224). In some embodiments, the number of transmitting coils (e.g., first coil 206, second coil 210 or third coil 214) activated is based upon the position of the receiving coils (e.g., fourth coil 220, fifth coil 222 or sixth coil 224). For example, in some embodiments, if one or more receiver coils (e.g., fourth coil 220, fifth coil 222 or sixth coil 224) are positioned such that the amount of power transferred to the one or more receiving coils (e.g., fourth coil 220, fifth coil 222 or sixth coil 224) is increased by activating multiple transmitting coils (e.g., first coil 206, second coil 210 or third coil 214), then multiple transmitting coils (e.g., first coil 206, second coil 210 or third coil 214) are activated. In some embodiments, the number of transmitting coils (e.g., first coil 206, second coil 210 or third coil 214) activated is based upon the distance between the transmitting coil (e.g., first coil 206, second coil 210 or third coil 214) and the receiving coil (e.g., fourth coil 220, fifth coil 222 or sixth coil 224). In some embodiments, the number of coils activated is based upon the orientation of the transmitting coil (e.g., first coil 206, second coil 210 or third coil 214) or the orientation of the receiving coil (e.g., fourth coil 220, fifth coil 222 or sixth coil 224).

Figure 5A:
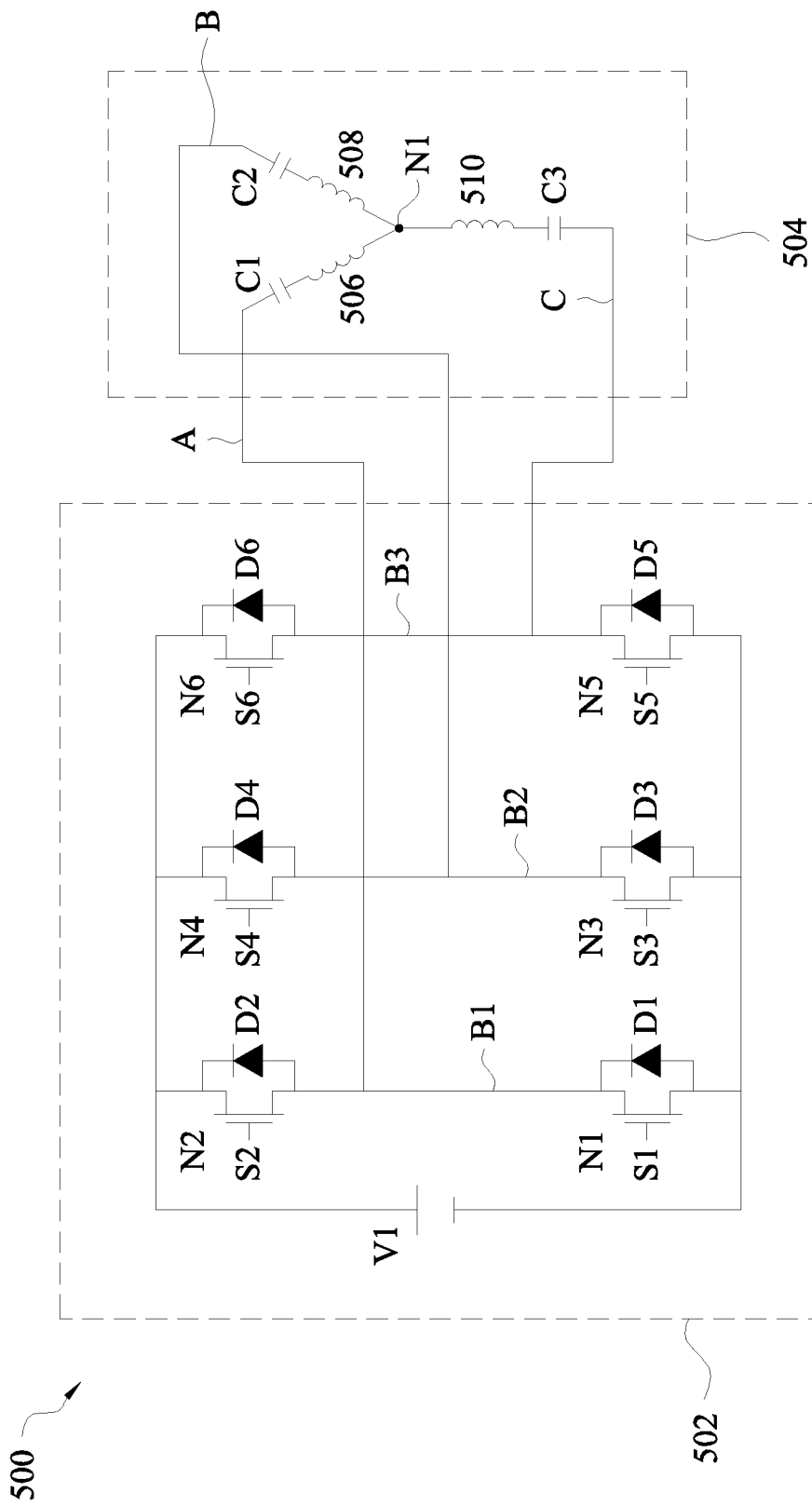
FIG. 5A is a schematic diagram of a portion of a transmitter in accordance with some embodiments.

FIG. 5A is a schematic diagram of a portion of a transmitter 500 in accordance with one or more embodiments. Transmitter 500 is an embodiment of transmitter 102 shown in FIG. 1 with similar elements. Driver circuit 502 is an embodiment of driver circuit 112 shown in FIG. 1 with similar elements. One or more coils 504 are an embodiment of one or more coils 114 shown in FIG. 1 with similar elements. First coil 506 is an embodiment of first coil 114a shown in FIG. 1 with similar elements. Second coil 508 is an embodiment of second coil 114b shown in FIG. 1 with similar elements. Third coil 510 is an embodiment of third coil 114c shown in FIG. 1 with similar elements.

Transmitter 500 comprises a driver circuit 502 and one or more coils 504.

Driver circuit 502 is communicably connected with one or more coils 504. In some embodiments, driver circuit 502 is electrically connected with one or more coils 504. Driver circuit 502 is configured to receive a control signal (e.g., first control signal S1, second control signal S2, third control signal S3, fourth control signal S4, fifth control signal S5 or sixth control signal S6) which activates and deactivates corresponding driver circuit elements (e.g., n-type metal oxide semiconductor (NMOS) transistors N1, N2, N3, N4, N5 and N6) within the driver circuit 502. Driver circuit 502 is configured to activate two or more elements in one or more coils 504 (e.g., first coil 506, second coil 508 or third coil 510) based upon the corresponding activated driver circuit elements (e.g., NMOS transistors N1, N2, N3, N4, N5 and N6) within the driver circuit 502.

In some embodiments, by selectively turning on/off (e.g., activating/deactivating) the driver circuit elements (e.g., NMOS transistors N1, N2, N3, N4, N5 and N6), two different AC current paths are provided in transmitter 500 which are sufficient to generate three different time-varying magnetic fields across three coils (e.g., first coil 506, second coil 508 and third coil 510) in transmitter 500. In some embodiments, the three different time-varying magnetic fields across coils (e.g., first coil 506, second coil 508 and third coil 510) in transmitter 500 are out of phase from another by 120 degrees.

In some embodiments, by selectively turning on/off (e.g., activating/deactivating) the driver circuit elements (e.g., NMOS transistors N1, N2, N3, N4, N5 and N6), a single AC current path is provided in transmitter 500 which is sufficient to generate two different time-varying magnetic fields across two of the three coils (e.g., first coil 506, second coil 508 or third coil 510) in transmitter 500.

In some embodiments, the driver circuit elements (e.g., NMOS transistors N1, N2, N3, N4, N5 and N6) are grouped into three branches (first branch B1, second branch B2 and third branch B3). The first branch B1 includes NMOS transistors N1 and N2. The second branch B2 includes NMOS transistors N3 and N4. The third branch B3 includes NMOS transistors N3 and N4. In some embodiments, the driver circuit elements within the first branch B1 (e.g., NMOS transistors N1 and N2) are arranged in a complementary manner such that when NMOS transistor N1 is switched on, NMOS transistor N2 is switched off, or when NMOS transistor N2 is switched on, NMOS transistor N1 is switched off. In some embodiments, the driver circuit elements within the second branch B2 (e.g., NMOS transistors N3 and N4) are arranged in a complementary manner such that when NMOS transistor N3 is switched on, NMOS transistor N4 is switched off, or when NMOS transistor N4 is switched on, NMOS transistor N3 is switched off. In some embodiments, the driver circuit elements within the third branch B3 (e.g., NMOS transistors N5 and N6) are arranged in a complementary manner such that when NMOS transistor N5 is switched on, NMOS transistor N6 is switched off, or when NMOS transistor N6 is switched on, NMOS transistor N5 is switched off.

Driver circuit 502 comprises a voltage source V1, NMOS transistors N1, N2, N3, N4, N5 and N6, and diodes D1, D2, D3, D4, D5 and D6.

Voltage source V1 is electrically connected to NMOS transistors N1, N2, N3, N4, N5 and N6, and diodes D1, D2, D3, D4, D5 and D6. Voltage source V1 is configured to provide a voltage to NMOS transistors N1, N2, N3, N4, N5 and N6, and diodes D1, D2, D3, D4, D5 and D6. In some embodiments, voltage source V1 is a direct current (DC) voltage.

NMOS transistor N1 is electrically connected to diode D1 in a parallel configuration. The gate of NMOS transistor N1 is connected to the source of first control signal S1 (e.g., controller 110). The gate of NMOS transistor N1 is configured to receive first control signal S1. In some embodiments, first control signal S1 is an enable/disable signal which selectively turns on/off NMOS transistor N1. First control signal S1 is, e.g., a logically low signal or a logically high signal. The drain of NMOS transistor N1 is connected to the cathode of diode D1, the source of NMOS transistor N2, the anode of diode D2 and capacitor C1. The source of NMOS transistor N1 is connected to the source of NMOS transistors N3 and N5, the anode of diodes D1, D3 and D5 and the negative terminal of voltage source V1.

The cathode of diode D1 is connected to the drain of NMOS transistor N1, the source of NMOS transistor N2, the anode of diode D2 and capacitor C1. The anode of diode D1 is connected to the source of NMOS transistors N1, N3 and N5, the anode of diodes D3 and D5 and the negative terminal of voltage source V1. In some embodiments, diode D1 is formed with NMOS transistor N1 as a body diode, and therefore an additional diode component is omitted in these embodiments.

NMOS transistor N2 is electrically connected to diode D2 in a parallel configuration. The gate of NMOS transistor N2 is connected to the source of second control signal S2 (e.g., controller 110). The gate of NMOS transistor N2 is configured to receive second control signal S2. In some embodiments, second control signal S2 is an enable/disable signal which selectively turns on/off NMOS transistor N2. Second control signal S2 is, e.g., a logically low signal or a logically high signal. The drain of NMOS transistor N2 is connected to the drain of NMOS transistors N4 and N6, the cathode of diodes D2, D4 and D6 and the positive terminal of voltage source V1. The source of NMOS transistor N2 is connected to the cathode of diode D1, the drain of NMOS transistor N1, the anode of diode D2 and capacitor C1.

In some embodiments, NMOS transistor N2 and NMOS transistor N1 are configured such that when one of the NMOS transistors (e.g., N2 or N1) is switched on, the other corresponding NMOS transistor (e.g., N1 or N2) is switched off. In some embodiments, first control signal S1 is an inverted version of second control signal S2. In some embodiments, second control signal S2 is an inverted version of first control signal S1.

The cathode of diode D2 is connected to the drain of NMOS transistors N2, N4 and N6, the cathode of diodes D4 and D6 and the positive terminal of voltage source V1. The anode of diode D2 is connected to the drain of NMOS transistor N1, the source of NMOS transistor N2, the cathode of diode D1 and capacitor C1. In some embodiments, diode D2 is formed with NMOS transistor N2 as a body diode, and therefore an additional diode component is omitted in these embodiments.

NMOS transistor N3 is electrically connected to diode D3 in a parallel configuration. The gate of NMOS transistor N3 is connected to the source of third control signal S3 (e.g., controller 110). The gate of NMOS transistor N3 is configured to receive third control signal S3. In some embodiments, third control signal S3 is an enable/disable signal which selectively turns on/off NMOS transistor N3. Third control signal S3 is, e.g., a logically low signal or a logically high signal. The drain of NMOS transistor N3 is connected to the cathode of diode D3, the source of NMOS transistor N4, the anode of diode D4 and capacitor C2. The source of NMOS transistor N3 is connected to the source of NMOS transistors N1 and N5, the anode of diodes D1, D3 and D5 and the negative terminal of voltage source V1.

The cathode of diode D3 is connected to the drain of NMOS transistor N3, the source of NMOS transistor N4, the anode of diode D4 and capacitor C2. The anode of diode D3 is connected to the source of NMOS transistors N1, N3 and N5, the anode of diodes D1 and D5 and the negative terminal of voltage source V1. In some embodiments, diode D3 is formed with NMOS transistor N3 as a body diode, and therefore an additional diode component is omitted in these embodiments.

NMOS transistor N4 is electrically connected to diode D4 in a parallel configuration. The gate of NMOS transistor N4 is connected to the source of fourth control signal S4 (e.g., controller 110). The gate of NMOS transistor N4 is configured to receive fourth control signal S4. In some embodiments, fourth control signal S4 is an enable/disable signal which selectively turns on/off NMOS transistor N4. Fourth control signal S4 is, e.g., a logically low signal or a logically high signal. The drain of NMOS transistor N4 is connected to the drain of NMOS transistors N2 and N6, the cathode of diodes D2, D4 and D6 and the positive terminal of voltage source V1. The source of NMOS transistor N4 is connected to the cathode of diode D3, the drain of NMOS transistor N3, the anode of diode D4 and capacitor C2.

In some embodiments, NMOS transistor N4 and NMOS transistor N3 are configured such that when one of the NMOS transistors (e.g., N4 or N3) is switched on, the other corresponding NMOS transistor (e.g., N3 or N4) is switched off. In some embodiments, third control signal S3 is an inverted version of fourth control signal S4. In some embodiments, fourth control signal S4 is an inverted version of third control signal S3.

The cathode of diode D4 is connected to the drain of NMOS transistors N2, N4 and N6, the cathode of diodes D2 and D6 and the positive terminal of voltage source V1. The anode of diode D4 is connected to the drain of NMOS transistor N3, the source of NMOS transistor N4, the cathode of diode D3 and capacitor C2. In some embodiments, diode D4 is formed with NMOS transistor N4 as a body diode, and therefore an additional diode component is omitted in these embodiments.

NMOS transistor N5 is electrically connected to diode D5 in a parallel configuration. The gate of NMOS transistor N5 is connected to the source of fifth control signal S5 (e.g., controller 110). The gate of NMOS transistor N5 is configured to receive fifth control signal S5. In some embodiments, fifth control signal S5 is an enable/disable signal which selectively turns on/off NMOS transistor N5. Fifth control signal S5 is, e.g., a logically low signal or a logically high signal. The drain of NMOS transistor N5 is connected to the cathode of diode D5, the source of NMOS transistor N6, the anode of diode D6 and capacitor C3. The source of NMOS transistor N5 is connected to the source of NMOS transistors N1 and N3, the anode of diodes D1, D3 and D5 and the negative terminal of voltage source V1.

The cathode of diode D5 is connected to the drain of NMOS transistor N5, the source of NMOS transistor N6, the anode of diode D6 and capacitor C3. The anode of diode D5 is connected to the source of NMOS transistors N1, N3 and N5, the anode of diodes D1 and D3 and the negative terminal of voltage source V1. In some embodiments, diode D5 is formed with NMOS transistor N5 as a body diode, and therefore an additional diode component is omitted in these embodiments.

NMOS transistor N6 is electrically connected to diode D6 in a parallel configuration. The gate of NMOS transistor N6 is connected to the source of sixth control signal S6 (e.g., controller 110). The gate of NMOS transistor N6 is configured to receive sixth control signal S6. In some embodiments, sixth control signal S6 is an enable/disable signal which selectively turns on/off NMOS transistor N6. Sixth control signal S6 is, e.g., a logically low signal or a logically high signal. The drain of NMOS transistor N6 is connected to the drain of NMOS transistors N2 and N4, the cathode of diodes D2, D4 and D6 and the positive terminal of voltage source V1. The source of NMOS transistor N6 is connected to the cathode of diode D5, the drain of NMOS transistor N5, the anode of diode D6 and capacitor C3.

In some embodiments, NMOS transistor N6 and NMOS transistor N5 are configured such that when one of the NMOS transistors (e.g., N6 or N5) is switched on, the other corresponding NMOS transistor (e.g., N5 or N6) is switched off. In some embodiments, fifth control signal S5 is an inverted version of sixth control signal S6. In some embodiments, sixth control signal S6 is an inverted version of fifth control signal S5.

The cathode of diode D6 is connected to the drain of NMOS transistors N2, N4 and N6, the cathode of diodes D2 and D4 and the positive terminal of voltage source V1. The anode of diode D6 is connected to the drain of NMOS transistor N5, the source of NMOS transistor N6, the cathode of diode D5 and capacitor C3. In some embodiments, diode D6 is formed with NMOS transistor N6 as a body diode, and therefore an additional diode component is omitted in these embodiments.

One or more coils 504 comprises a first coil 506, a capacitor C1, a second coil 508, a capacitor C2, a third coil 510 and a capacitor C3.

One or more coils 504 is arranged in a Y-configuration, where three branches (e.g., a first branch A, a second branch B and a third branch C) are connected to a common node N1. First branch A comprises first coil 506 and first capacitor C1. Second branch B comprises second coil 508 and second capacitor C2. Third branch C comprises third coil 510 and third capacitor C3.

Figure 6:
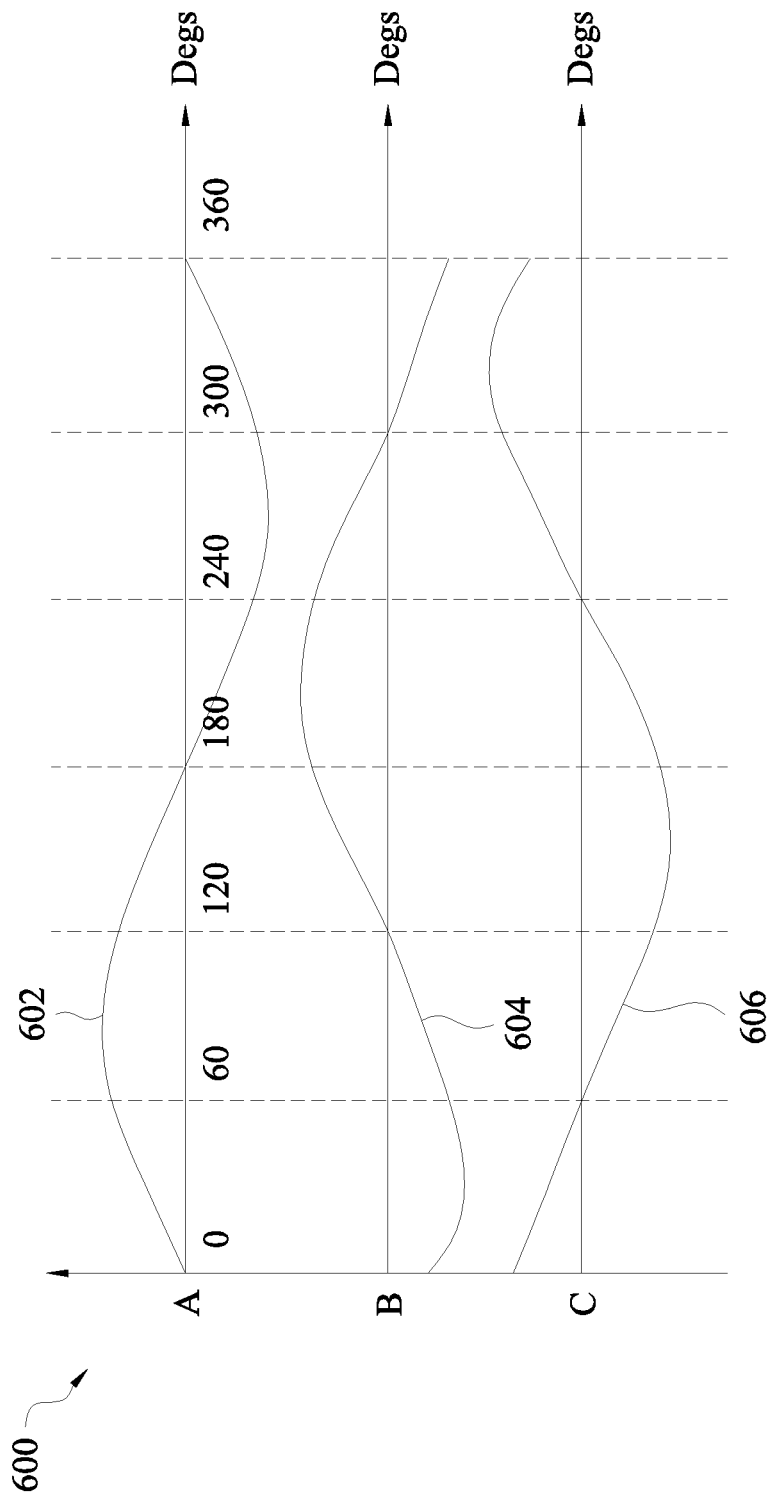
FIG. 6 is a waveform diagram of signals applied to one or more coils in accordance with one or more embodiments.

In some embodiments, the AC current signal delivered to each of the branches (e.g., first branch A, second branch B and third branch C) is 120 degrees out of phase with another (as shown in FIG. 6). In some embodiments, the magnitude of the voltage across each of the branches (e.g., first branch A, second branch B and third branch C) is substantially equal and the phase of the voltage across each of the branches (e.g., first branch A, second branch B and third branch C) is 120 degrees out of phase with another.

Capacitor C1 is electrically connected to first coil 506, the cathode of diode D1, the drain of NMOS transistor N1, the source of NMOS transistor N2 and the anode of diode D2.

First coil 506 is electrically connected to capacitor C1, second coil 508 and third coil 510. In some embodiments, the inductance L1 of first coil 506 and the capacitance value of capacitor C1 are chosen to achieve resonance.

Capacitor C2 is electrically connected to second coil 508, the cathode of diode D3, the drain of NMOS transistor N3, the source of NMOS transistor N4 and the anode of diode D4.

Second coil 508 is electrically connected to capacitor C2, first coil 506 and third coil 510. In some embodiments, the inductance L2 of second coil 508 and the capacitance value of capacitor C2 are chosen to achieve resonance.

Capacitor C3 is electrically connected to third coil 510, the cathode of diode D5, the drain of NMOS transistor N5, the source of NMOS transistor N6 and the anode of diode D6.

Third coil 510 is electrically connected to capacitor C3, first coil 506 and second coil 508. In some embodiments, the inductance L3 of third coil 510 and the capacitance value of capacitor C3 are chosen to achieve resonance.

Figure 5B:
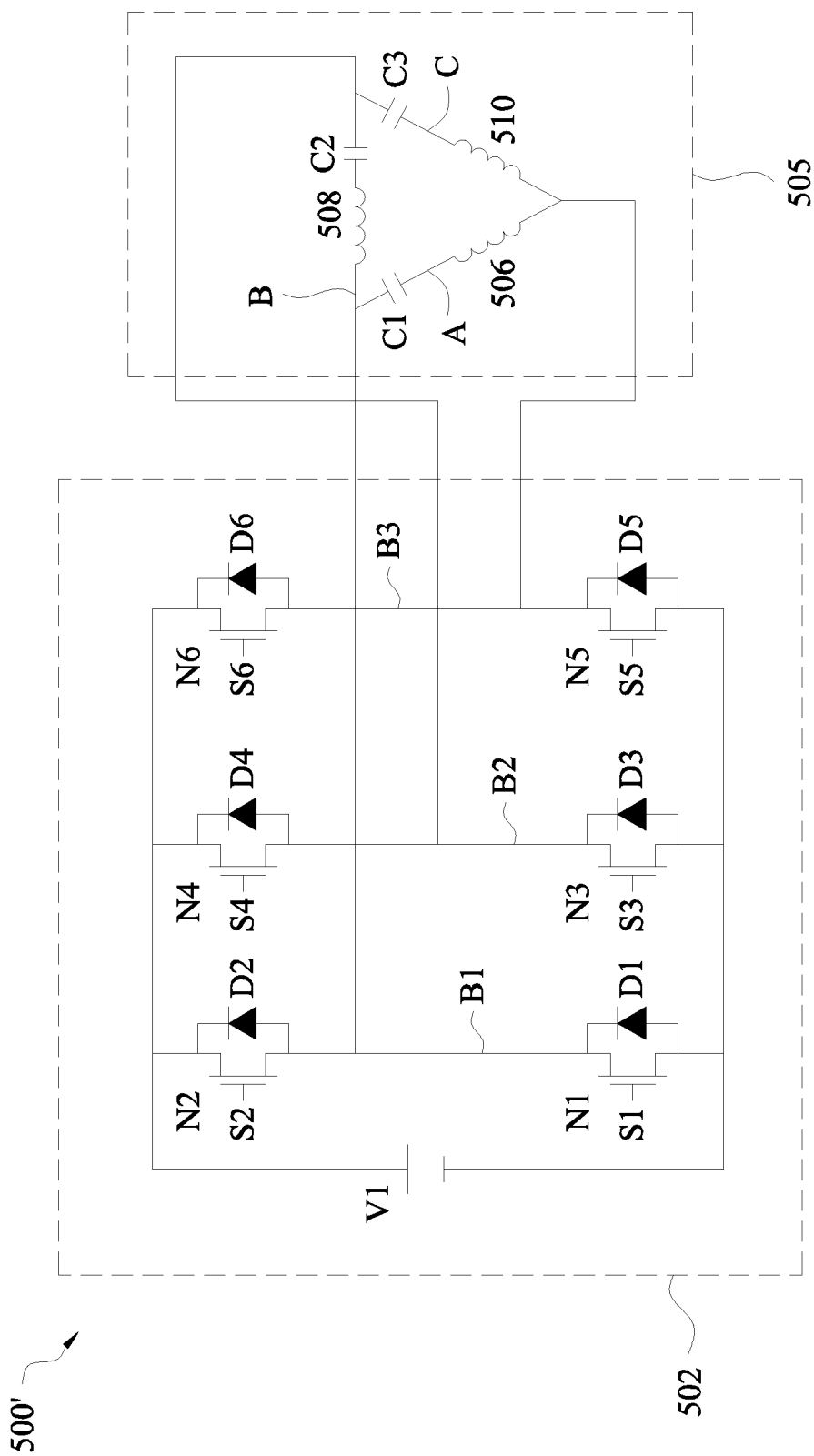
FIG. 5B is a schematic diagram of a portion of a transmitter in accordance with some embodiments.

FIG. 5B is a schematic diagram of a portion of a transmitter 500' in accordance with one or more embodiments. Transmitter 500' is an embodiment of transmitter 102 shown in FIG. 1 with similar elements. Transmitter 500' is an embodiment of transmitter 500 shown in FIG. 5A with similar elements. Driver circuit 502 is an embodiment of driver circuit 112 shown in FIG. 1 with similar elements. One or more coils 505 are an embodiment of one or more coils 114 shown in FIG. 1 with similar elements. One or more coils 505 are an embodiment of one or more coils 504 shown in FIG. 5A with similar elements. First coil 506 is an embodiment of first coil 114a shown in FIG. 1 with similar elements. Second coil 508 is an embodiment of second coil 114b shown in FIG. 1 with similar elements. Third coil 510 is an embodiment of third coil 114c shown in FIG. 1 with similar elements.

Transmitter 500' comprises a driver circuit 502 and one or more coils 505. In comparison with FIG. 5A, the transmitter 500' of FIG. 5B does not include one or more coils 504. In comparison with FIG. 5A, the transmitter 500' of FIG. 5B includes one or more coils 505. Driver circuit 502 is communicably connected with one or more coils 505. In some embodiments, driver circuit 502 is electrically connected with one or more coils 505.

One or more coils 505 comprises a first coil 506, a capacitor C1, a second coil 508, a capacitor C2, a third coil 510 and a capacitor C3.

One or more coils 505 is arranged in a delta-configuration, where three branches (e.g., a first branch A, a second branch B and a third branch C) are connected to each other in the shape of a delta.

Capacitor C1 is electrically connected to first coil 506, second coil 508, the cathode of diode D1, the drain of NMOS transistor N1, the source of NMOS transistor N2 and the anode of diode D2.

First coil 506 is electrically connected to capacitor C1, third coil 510, the cathode of diode D5, the drain of NMOS transistor N5, the source of NMOS transistor N6 and the anode of diode D6. In some embodiments, the inductance L1 of first coil 506 and the capacitance value of capacitor C1 are chosen to achieve resonance.

Capacitor C2 is electrically connected to capacitor C3, second coil 508, the cathode of diode D3, the drain of NMOS transistor N3, the source of NMOS transistor N4 and the anode of diode D4.

Second coil 508 is electrically connected to capacitor C2, capacitor C1, the cathode of diode D1, the drain of NMOS transistor N1, the source of NMOS transistor N2 and the anode of diode D2. In some embodiments, the inductance L2 of second coil 508 and the capacitance value of capacitor C2 are chosen to achieve resonance.

Capacitor C3 is electrically connected to second capacitor C2, third coil 510, the cathode of diode D3, the drain of NMOS transistor N3, the source of NMOS transistor N4 and the anode of diode D4.

Third coil 510 is electrically connected to capacitor C3, first coil 506, the cathode of diode D5, the drain of NMOS transistor N5, the source of NMOS transistor N6 and the anode of diode D6. In some embodiments, the inductance L3 of third coil 510 and the capacitance value of capacitor C3 are chosen to achieve resonance.

In some embodiments, the AC current signal delivered to each of the branches (e.g., first branch A, second branch B and third branch C) is 120 degrees out of phase with another (as shown in FIG. 6). In some embodiments, the magnitude of the voltage across each of the branches (e.g., first branch A, second branch B and third branch C) is substantially equal and the phase of the voltage across each of the branches (e.g., first branch A, second branch B and third branch C) is 120 degrees out of phase with another.

FIG. 6 is a waveform diagram of signals applied to one or more coils 500 or 500' in accordance with one or more embodiments.

Curve 602 represents the AC current signal which passes through branch A (shown in FIGS. 5A-5B and 7A-7F); curve 604 represents the AC current signal which passes through branch B (shown in FIGS. 5A-5B and 7A-7F); and curve 606 represents the AC current signal which passes through branch C (shown in FIGS. 5A-5B and 7A-7F).

Curve 602 is 120 degrees out of phase with curve 604 and curve 606. Curve 604 is 120 degrees out of phase with curve 602 and curve 606. Curve 606 is 120 degrees out of phase with curve 602 and curve 604. Curves 602, 604 and 606 oscillate at a resonance frequency of one or more coils 500 or 500'.

Figure 7A:
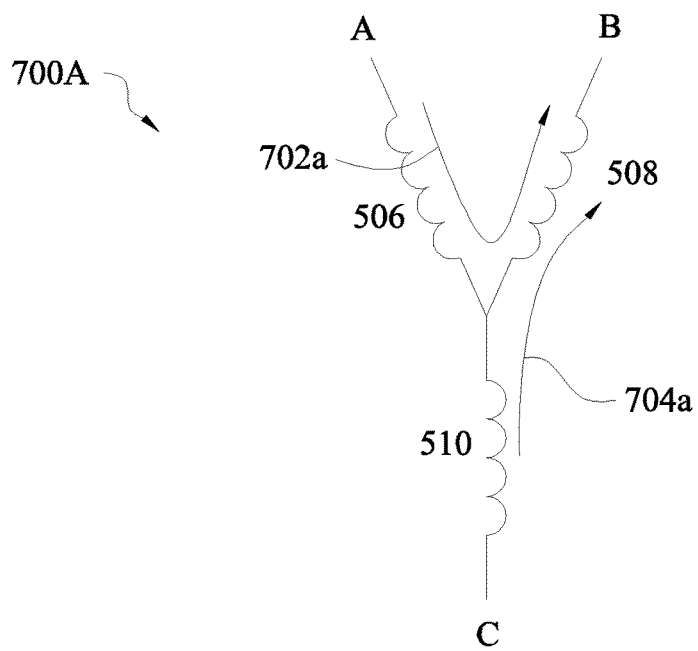
FIG. 7A is a schematic diagram of a portion of one or more coils in accordance with one or more embodiments.

FIG. 7A is a schematic diagram of a portion of one or more coils 700A in accordance with one or more embodiments. One or more coils 700A is an embodiment of one or more coils 504 shown in FIG. 5A with similar elements.

A first current signal 702a and a second current signal 704a are applied to one or more coils 504 shown in FIG. 7A. First current signal 702a illustrates a path of a first AC current signal through one or more coils 504. In some embodiments, first current signal 702a passes through first coil 506 and second coil 508. Second current signal 704a illustrates a path of a second AC current signal through one or more coils 504. In some embodiments, second current signal 704a passes through third coil 510 and second coil 508. In some embodiments, first current signal 702a and second current signal 704a are sufficient to generate the AC current signals (e.g., curves 602, 604 and 606) shown in FIG. 6 from 0 degrees to 60 degrees.

First current signal 702a and second current signal 704a are generated by driver circuit 502 (shown in FIG. 5A or 5B). For example, NMOS transistors N1, N2, N3, N4, N5 and N6 in driver circuit 502 (shown in FIG. 5A) are selectively controlled by control signals (e.g, first control signal S1, second control signal S2, third control signal S3, fourth control signal S4, fifth control signal S5 and sixth control signal S6) to produce first current signal (e.g., 702a, 702b, 702c, 702d, 702e and 702f) and second current signal (e.g., 704a, 704b, 704c, 704d, 704e and 7040 described in FIGS. 7A-7E. In some embodiments, NMOS transistors N2, N3 and N6 (in driver circuit 502) are switched on, NMOS transistors N1, N4 and N5 (in driver circuit 502) are switched off, and first current signal 702a and second current signal 704a are generated.

Figure 7B:
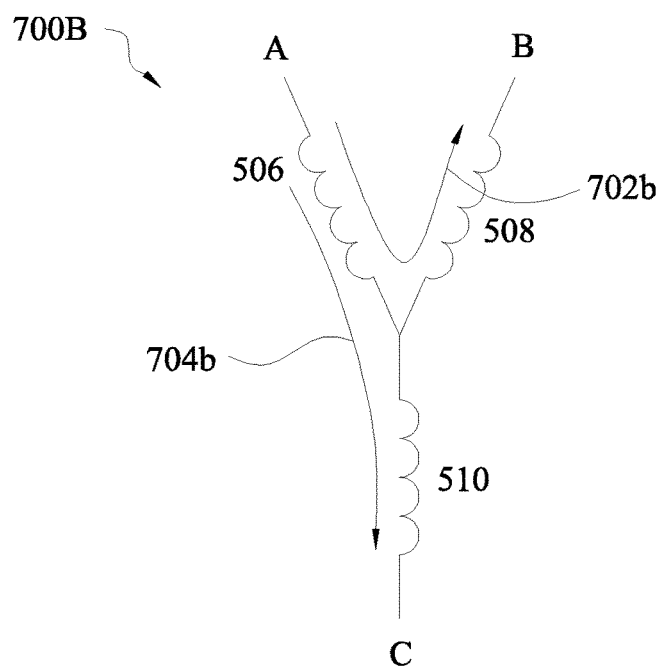
FIG. 7B is a schematic diagram of a portion of one or more coils in accordance with one or more embodiments.

FIG. 7B is a schematic diagram of a portion of one or more coils 700B in accordance with one or more embodiments. One or more coils 700B is an embodiment of one or more coils 504 shown in FIG. 5A with similar elements.

A first current signal 702b and a second current signal 704b are applied to one or more coils 504 shown in FIG. 7B. First current signal 702b illustrates a path of a first AC current signal through one or more coils 504. In some embodiments, first current signal 702b passes through first coil 506 and second coil 508. Second current signal 704b illustrates a path of a second AC current signal through one or more coils 504. In some embodiments, second current signal 704b passes through first coil 506 and third coil 510. In some embodiments, first current signal 702b and second current signal 704b are sufficient to generate the AC current signals (e.g., curves 602, 604 and 606) shown in FIG. 6 from 60 degrees to 120 degrees.

First current signal 702b and second current signal 704b are generated by driver circuit 502 (shown in FIG. 5A or 5B). In some embodiments, NMOS transistors N2, N3 and N5 (in driver circuit 502) are switched on, NMOS transistors N1, N4 and N6 (in driver circuit 502) are switched off, and first current signal 702b and second current signal 704b are generated.

Figure 7C:
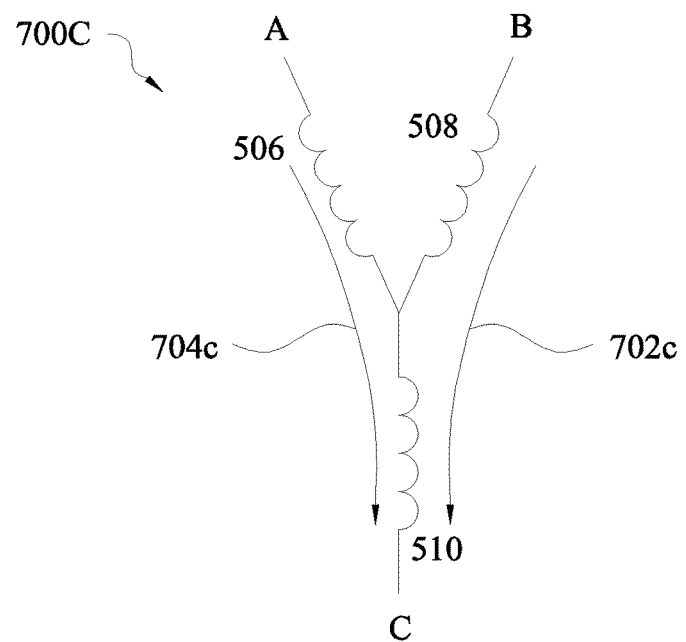
FIG. 7C is a schematic diagram of a portion of one or more coils in accordance with one or more embodiments.

FIG. 7C is a schematic diagram of a portion of one or more coils 700C in accordance with one or more embodiments. One or more coils 700C is an embodiment of one or more coils 504 shown in FIG. 5A with similar elements.

A first current signal 702c and a second current signal 704c are applied to the one or more coils 504 shown in FIG. 7C. First current signal 702c illustrates a path of a first AC current signal through one or more coils 504. In some embodiments, first current signal 702c passes through second coil 508 and third coil 510. Second current signal 704c illustrates a path of a second AC current signal through one or more coils 504. In some embodiments, second current signal 704c passes through first coil 506 and third coil 510. In some embodiments, first current signal 702c and second current signal 704c are sufficient to generate the AC current signals (e.g., curves 602, 604 and 606) shown in FIG. 6 from 120 degrees to 180 degrees.

First current signal 702c and second current signal 704c are generated by driver circuit 502 (shown in FIG. 5A or 5B). In some embodiments, NMOS transistors N2, N4 and N5 (in driver circuit 502) are switched on, NMOS transistors N1, N3 and N6 (in driver circuit 502) are switched off, and first current signal 702c and second current signal 704c are generated.

Figure 7D:
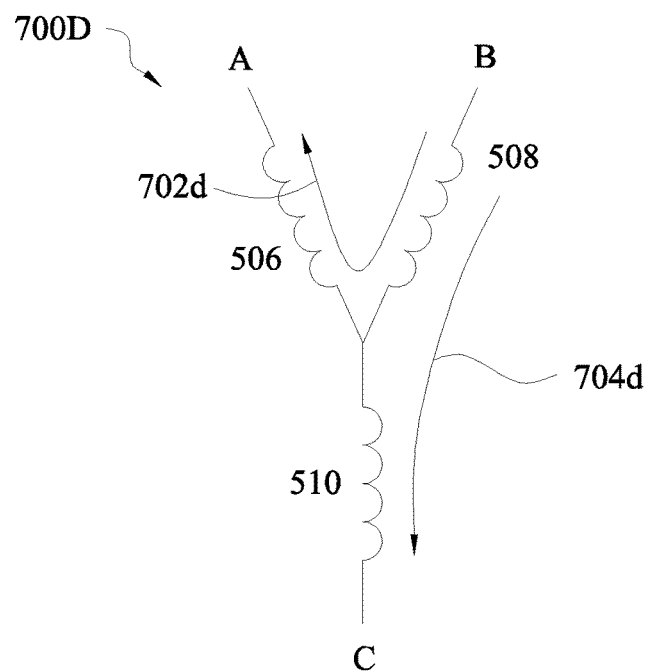
FIG. 7D is a schematic diagram of a portion of one or more coils in accordance with one or more embodiments.

FIG. 7D is a schematic diagram of a portion of one or more coils 700D in accordance with one or more embodiments. One or more coils 700D is an embodiment of one or more coils 504 shown in FIG. 5A with similar elements.

A first current signal 702d and a second current signal 704d are applied to one or more coils 504 shown in FIG. 7D. First current signal 702d illustrates a path of a first AC current signal through one or more coils 504. In some embodiments, first current signal 702d passes through second coil 508 and first coil 506. Second current signal 704d illustrates a path of a second AC current signal through one or more coils 504. In some embodiments, second current signal 704d passes through second coil 508 and third coil 510. In some embodiments, first current signal 702d and second current signal 704d are sufficient to generate the AC current signals (e.g., curves 602, 604 and 606) shown in FIG. 6 from 180 degrees to 240 degrees.

First current signal 702d and second current signal 704d are generated by driver circuit 502 (shown in FIG. 5A or 5B). In some embodiments, NMOS transistors N1, N4 and N5 (in driver circuit 502) are switched on, NMOS transistors N2, N3 and N6 (in driver circuit 502) are switched off, and first current signal 702d and second current signal 704d are generated.

Figure 7E:
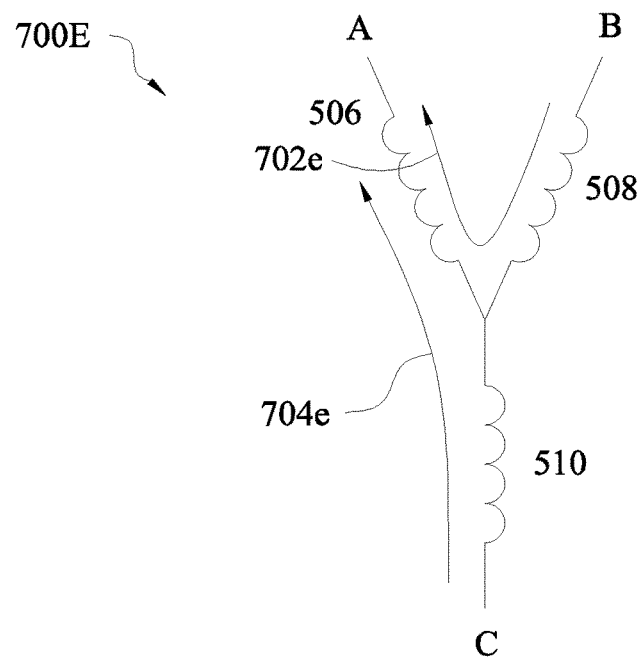
FIG. 7E is a schematic diagram of a portion of one or more coils in accordance with one or more embodiments.

FIG. 7E is a schematic diagram of a portion of one or more coils 700E in accordance with one or more embodiments. One or more coils 700E is an embodiment of one or more coils 504 shown in FIG. 5A with similar elements.

A first current signal 702e and a second current signal 704e are applied to one or more coils 504 shown in FIG. 7E. First current signal 702e illustrates a path of a first AC current signal through one or more coils 504. In some embodiments, first current signal 702e passes through second coil 508 and first coil 506. Second current signal 704e illustrates a path of a second AC current signal through one or more coils 504. In some embodiments, second current signal 704e passes through third coil 510 and first coil 506. In some embodiments, first current signal 702e and second current signal 704e are sufficient to generate the AC current signals (e.g., curves 602, 604 and 606) shown in FIG. 6 from 240 degrees to 300 degrees.

First current signal 702e and second current signal 704e are generated by driver circuit 502 (shown in FIG. 5A or 5B). In some embodiments, NMOS transistors N1, N4 and N6 (in driver circuit 502) are switched on, NMOS transistors N2, N3 and N5 (in driver circuit 502) are switched off, and first current signal 702e and second current signal 704e are generated.

Figure 7F:
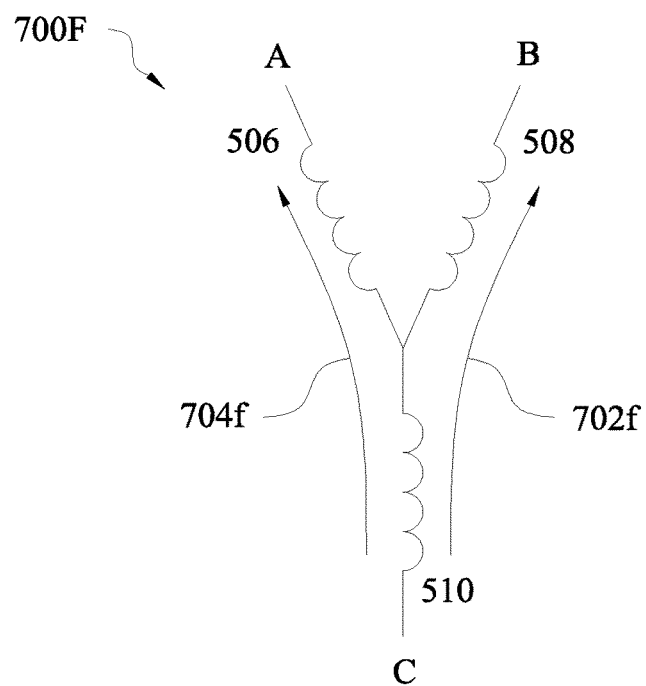
FIG. 7F is a schematic diagram of a portion of one or more coils in accordance with one or more embodiments.

FIG. 7F is a schematic diagram of a portion of one or more coils 700F in accordance with one or more embodiments. One or more coils 700F is an embodiment of one or more coils 504 shown in FIG. 5A with similar elements.

A first current signal 702f and a second current signal 704f are applied to one or more coils 504 shown in FIG. 7F. First current signal 702f illustrates a path of a first AC current signal through one or more coils 504. In some embodiments, first current signal 702F passes through third coil 510 and second coil 508. Second current signal 704f illustrates a path of a second AC current signal through one or more coils 504. In some embodiments, second current signal 704f passes through third coil 510 and first coil 506. In some embodiments, first current signal 702f and second current signal 704f are sufficient to generate the AC current signals (e.g., curves 602, 604 and 606) shown in FIG. 6 from 300 degrees to 360 degrees.

First current signal 702f and second current signal 704f are generated by driver circuit 502 (shown in FIG. 5A or 5B). In some embodiments, NMOS transistors N1, N3 and N6 (in driver circuit 502) are switched on, NMOS transistors N2, N4 and N5 (in driver circuit 502) are switched off, and first current signal 702f and second current signal 704f are generated.

Figure 8:
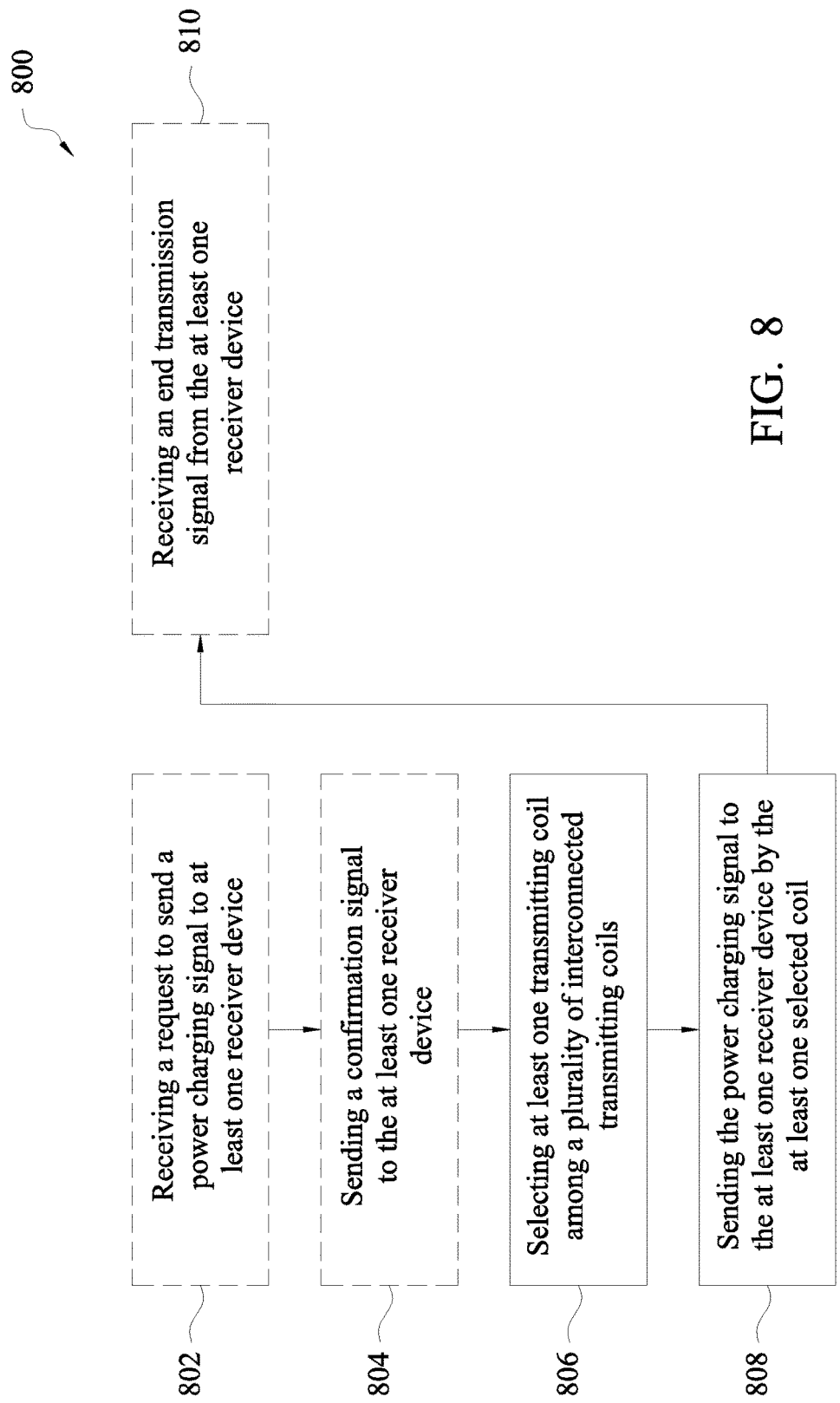
FIG. 8 is a flow chart of a method of wirelessly charging an electronic device in accordance with some embodiments.

FIG. 8 is a flow chart of a method 800 of wirelessly charging an electronic device in accordance with some embodiments. In some embodiments, the method 800 is performed by operating a transmitter (e.g., transmitter 1000 in FIG. 10). It is understood that additional operations may be performed before, during, and/or after the method 800 depicted in FIG. 8, and that some other processes may only be briefly described herein.

Method 800 begins with receiving a request to send a power charging signal (e.g., power signal 109) to at least one receiver (e.g., first receiver 104a or second receiver 104b) in operation 802. In some embodiments, the at least one receiver (e.g., first receiver 104a or second receiver 104b) is configured to be charged by the power charging signal. In some embodiments, operation 802 is optional where a request for a power transfer signal is not implemented.

Method 800 continues with operation 804 in which a confirmation signal is sent to the at least one receiver (e.g., first receiver 104a or second receiver 104b). In some embodiments, the confirmation signal is utilized to inform the at least one receiver (e.g., first receiver 104a or second receiver 104b) that the power charging signal (e.g., power signal 109) request was received. In some embodiments, operation 804 is optional where a confirmation signal is not implemented.

Method 800 continues with operation 806 in which at least one transmitting coil (e.g., first coil 114a, second coil 114b or third coil 114c shown in FIG. 1) among a plurality of interconnected transmitting coils (e.g., first coil 114a, second coil 114b or third coil 114c shown in FIG. 1) is selected.

Method 800 continues with operation 808 in which a power charging signal (e.g., power signal 109) is sent to the at least one receiver (e.g., first receiver 104a or second receiver 104b) by the selected coils (e.g., first coil 114a, second coil 114b or third coil 114c shown in FIG. 1).

Method 800 continues with operation 810 in which an end transmission signal is received from the at least one receiver (e.g., first receiver 104a or second receiver 104b). In some embodiments, the end transmission signal is utilized to inform the transmitter (e.g., transmitter 102) that the at least one receiver (e.g., first receiver 104a or second receiver 104b) no longer needs power from the power charging signal (e.g., power signal 109). In some embodiments, operation 810 is optional where an end transmission signal is not implemented. For example, in some embodiments, power transmission is if further information is provided by the at least one receiver which enables a determination by the transmitter 102 of the amount of power needed.

Figure 9A:
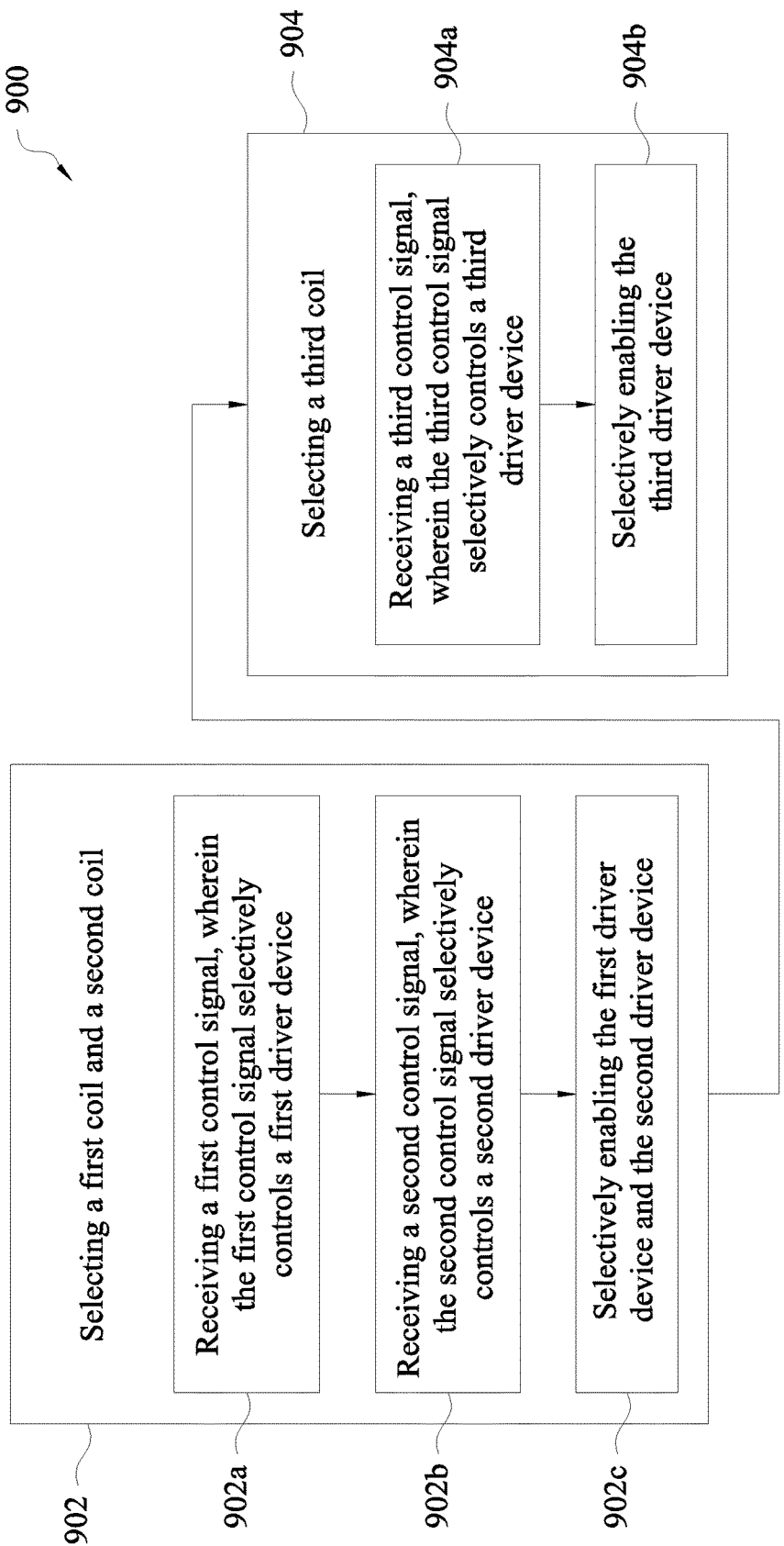
FIG. 9A is a flow chart of a method of selecting at least one transmitting coil among a plurality of interconnected coils in accordance with some embodiments.

FIG. 9A is a flow chart of a method 900 of selecting at least one transmitting coil among a plurality of interconnected coils in accordance with some embodiments. Method 900 is an embodiment of operation 806 shown in FIG. 8. In some embodiments, the method 900 is performed by operating a transmitter (e.g., transmitter 1000 in FIG. 10). It is understood that additional operations may be performed before, during, and/or after the method 900 depicted in FIG. 9A, and that some other processes may only be briefly described herein. Method 900 begins with operation 902 in which a first coil (e.g., first coil 506, second coil 508 or third coil 510) and a second coil (e.g., first coil 506, second coil 508 or third coil 510) are selected. In some embodiments, operation 902 comprises operation 902a, operation 902b and operation 902c.

For example, operation 902a includes receiving a first control signal (e.g, first control signal S1, second control signal S2, third control signal S3, fourth control signal S4, fifth control signal S5 or sixth control signal S6), wherein the first control signal selectively controls a first driver element (e.g., NMOS transistor N1, N2, N3, N4, N5 or N6). In some embodiments, the first driver element is connected to the first coil (e.g., first coil 506, second coil 508 or third coil 510).

For example, operation 902b includes receiving a second control signal (e.g, first control signal S1, second control signal S2, third control signal S3, fourth control signal S4, fifth control signal S5 or sixth control signal S6), wherein the second control signal selectively controls a second driver element (e.g., NMOS transistor N1, N2, N3, N4, N5 or N6). In some embodiments, the second driver element is connected to the second coil (e.g., first coil 506, second coil 508 or third coil 510).

For example, operation 902c includes selectively enabling the first driver element (e.g., NMOS transistor N1, N2, N3, N4, N5 or N6) and the second driver element (e.g., NMOS transistor N1, N2, N3, N4, N5 or N6). In some embodiments, selectively enabling the first driver element (e.g., NMOS transistor N1, N2, N3, N4, N5 or N6) includes switching on the first driver element. In some embodiments, selectively enabling the second driver element (e.g., NMOS transistor N1, N2, N3, N4, N5 or N6) includes switching on the second driver element. In some embodiments, operation 902c includes selectively disabling (e.g., switching off) a complementary first driver element (e.g., NMOS transistor N1, N2, N3, N4, N5 or N6) or a complementary second driver element (e.g., NMOS transistor N1, N2, N3, N4, N5 or N6).

Method 900 continues with operation 904 in which a third coil (e.g., first coil 506, second coil 508 or third coil 510) is selected. In some embodiments, operation 904 comprises operation 904a and operation 904b.

For example, operation 904a includes receiving a third control signal (e.g, first control signal S1, second control signal S2, third control signal S3, fourth control signal S4, fifth control signal S5 or sixth control signal S6), wherein the third control signal selectively controls a third driver element (e.g., NMOS transistor N1, N2, N3, N4, N5 or N6). In some embodiments, the third driver element is connected to the third coil (e.g., first coil 506, second coil 508 or third coil 510).

For example, operation 904b includes selectively enabling the third driver element (e.g., NMOS transistor N1, N2, N3, N4, N5 or N6). In some embodiments, selectively enabling the third driver element (e.g., NMOS transistor N1, N2, N3, N4, N5 or N6) includes switching on the third driver element. In some embodiments, operation 904b includes selectively disabling (e.g., switching off) a complementary third driver element (e.g., NMOS transistor N1, N2, N3, N4, N5 or N6).

Figure 9B:
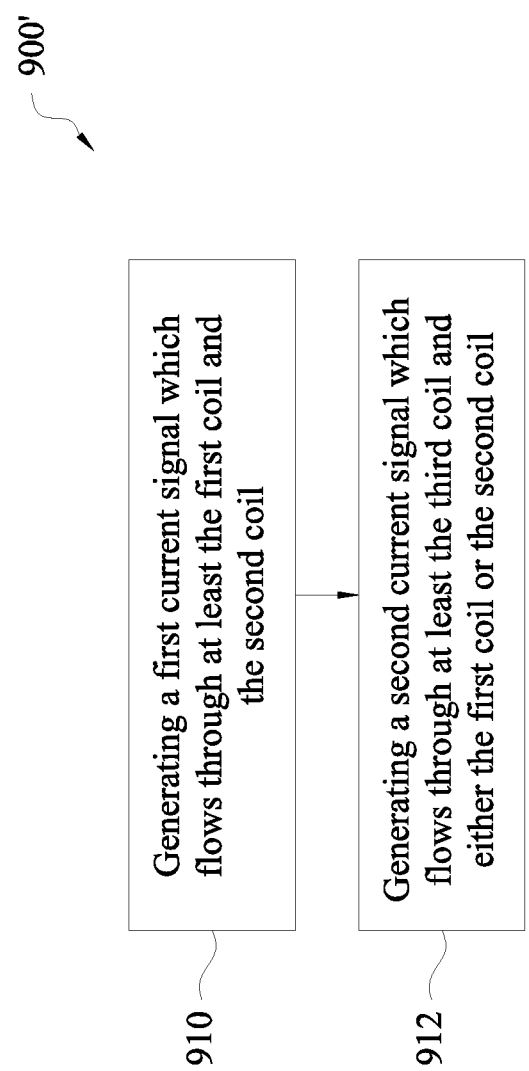
FIG. 9B is a flow chart of a method of sending the power charging signal to the receiver device by the selected coils in accordance with some embodiments.

FIG. 9B is a flow chart of a method 900' of sending the power charging signal to the receiver by the selected coils in accordance with some embodiments. Method 900' is an embodiment of operation 808 shown in FIG. 8. In some embodiments, the method 900' is performed by operating a transmitter (e.g., transmitter 1000 in FIG. 10). It is understood that additional operations may be performed before, during, and/or after the method 900' depicted in FIG. 9B, and that some other processes may only be briefly described herein.

Method 900' begins with operation 910 in which a first current signal (e.g., first current signal 702a, 702b, 702c, 702d, 702e or 702f) is generated. In some embodiments, the first current signal (e.g., first current signal 702a, 702b, 702c, 702d, 702e or 702f) flows through at least the first coil (e.g., first coil 506, second coil 508 or third coil 510) and the second coil (e.g., first coil 506, second coil 508 or third coil 510). In some embodiments, a frequency of the first current signal is substantially equal to a resonance frequency (e.g. resonance frequency F1) of the first coil and a resonance frequency (e.g. resonance frequency F2) of the second coil.

Method 900' continues with operation 912 in which a second current signal (e.g., second current signal 704a, 704b, 704c, 704d, 704e or 7040 is generated. In some embodiments, the second current signal (e.g., second current signal 704a, 704b, 704c, 704d, 704e or 7040 flows through at least the third coil (e.g., first coil 506, second coil 508 or third coil 510) and either the first coil (e.g., first coil 506, second coil 508 or third coil 510) or the second coil (e.g., first coil 506, second coil 508 or third coil 510). In some embodiments, a frequency of the second current signal is substantially equal to a resonant frequency (e.g. resonance frequency F3) of the third coil and either the resonant frequency (e.g. resonance frequency F1) of the first coil or the resonant frequency (e.g. resonance frequency F2) of the second coil.

In some embodiments, operations are able to be removed or that additional operations are able to be added to method 800, 900 or 900' without departing from the scope of this description. In some embodiments, an order of operations in method 800, 900 or 900' is able to be adjusted without departing from the scope of this description.

Figure 10:
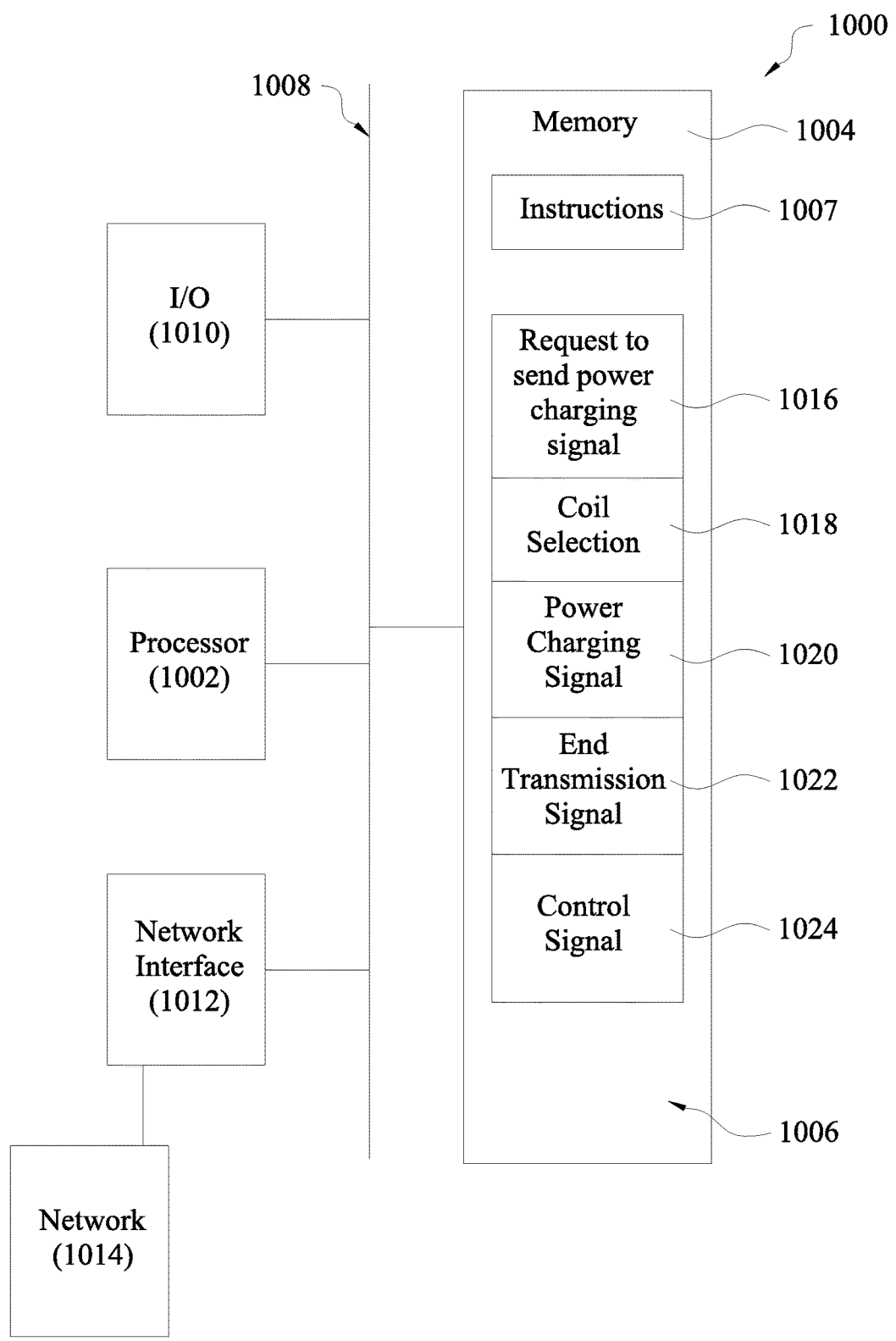
FIG. 10 is a block diagram of a portion of a transmitter in accordance with some embodiments.

FIG. 10 is a block diagram of a controller 1000 of a transmitter for wirelessly charging an electronic device in accordance with one or more embodiments. In some embodiments, the controller 1000 is an embodiment of the controller 110 shown in transmitter 102 in FIG. 1 with similar elements. In some embodiments, the controller 1000 is a computing device which implements method 800 of FIG. 8, method 900 of FIG. 9A and method 900' of FIG. 9B in accordance with one or more embodiments. Controller 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with transmitter/receiver for charging the electronic device. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause controller 1000 to be usable for performing a portion or all of the operations as described e.g., in method 800, 900 and 900'.

In one or more embodiments, the processor 1002 is a central processing unit (CPU), a multi-processor, a distributed processing system, an application specific integrated circuit (ASIC), and/or a suitable processing unit. The processor 1002 is an embodiment of controller 110 in FIG. 1 with similar elements.

In one or more embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 1004 includes a compact disk-read only memory (CD-ROM), a compact disk-read/write (CD-R/W), and/or a digital video disc (DVD).

In one or more embodiments, the storage medium 1004 stores the computer program code 1006 configured to cause controller 1000 to perform method 800, 900 or 900'. In one or more embodiments, the storage medium 1004 also stores information needed for performing method 800, 900 or 900' as well as information generated during performing method 800, 900 or 900', such as request to send power charging signal 1016, coil selection 1018, power charging signal 1020, end transmission signal 1022, control signal 1024, and/or a set of executable instructions to perform the operation of method 800, 900 or 900'.

In one or more embodiments, the storage medium 1004 stores instructions 1007 for interfacing with external machines. The instructions 1007 enable processor 1002 to generate instructions readable by the external machines to effectively implement method 800, 900 or 900' during a wireless power charging process. In some embodiments, the wireless power charging process is of one or more electronic devices.

Controller 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

Controller 1000 also includes network interface 1012 coupled to the processor 1002. Network interface 1012 allows controller 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1394. In one or more embodiments, method 800, 900 or 900' are implemented in two or more systems 1000, and information such as request to send power charging signal 1016, coil selection 1018, power charging signal 1020, end transmission signal 1022, control signal 1024 are exchanged between different controllers 1000 via network 1014.

Controller 1000 is configured to receive information related to a UI through I/O interface 1010. The information is transferred to processor 1002 via bus 1008 to generate a request to send a power charging signal. The UI is then stored in computer readable medium 1004 as request to send a power charging signal 1016. Controller 1000 is configured to receive information related to a coil selection through I/O interface 1010. The information is stored in computer readable medium 1004 as coil selection 1018. Controller 1000 is configured to receive information related to a power charging signal through I/O interface 1010. The information is stored in computer readable medium 1004 as power charging signal 1020. Controller 1000 is configured to receive information related to an end transmission signal through I/O interface 1010. The information is stored in computer readable medium 1004 as end transmission signal 1022. Controller 1000 is configured to receive information related to a control signal (e.g., first control signal S1, second control signal S2, third control signal S3, fourth control signal S4, fifth control signal S5 or sixth control signal S6) through I/O interface 1010. The information is stored in computer readable medium 1004 as control signal 1024.

One aspect of this description relates to a wireless charging system including a first coil configured to be coupled to a transmitter driver circuit and arranged in a first plane, a second coil configured to be coupled to the transmitter driver circuit and arranged in a second plane and a third coil configured to be coupled to the transmitter driver circuit and arranged in a third plane. Furthermore, the transmitter driver circuit is configured to provide a time-varying current signal to the first coil, the second coil or the third coil. The first coil, the second coil and the third coil are concentric, the first plane is not parallel to the second plane or the third plane and the second plane is not parallel to the third plane.

Another aspect of this description relates to a wireless charging device comprising a first coil configured to be coupled to a transmitter driver circuit and arranged in a first plane, a second coil configured to be coupled to the transmitter driver circuit and arranged in a second plane and a third coil configured to be coupled to the transmitter driver circuit and arranged in a third plane. Furthermore, the transmitter driver circuit is configured to provide a time-varying current signal to the first coil, the second coil or the third coil. Also, the first coil, the second coil and the third coil are concentric, the first plane is not parallel to the second plane or the third plane, the second plane is not parallel to the third plane, the first coil, the second coil or the third coil is configured to operate at a first resonant frequency and the first coil, the second coil and the third coil are configured to generate a substantially omni-directional magnetic field.

Still another aspect of this description relates to a method of wirelessly charging an electronic device. The method includes receiving a request to send a power charging signal to at least one receiver, selecting at least two transmitting coils, sending the power charging signal to the at least one receiver by the selected coils and receiving an end transmission signal. Furthermore, the at least one receiver is configured to be charged by the power charging signal and the end transmission signal alerts the transmitter to stop sending the power charging signal.

The foregoing outlines features of several embodiments so that those of ordinary skill in the art may better understand the aspects of the present disclosure. Those of ordinary skill in the art should appreciate that they may readily use the present disclosure as a basis for designing or modifying other circuits, processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A wireless charging system comprising:
   a first coil configured to be coupled to a transmitter driver circuit and arranged in a first plane;
   a second coil configured to be coupled to the transmitter driver circuit and arranged in a second plane; and
   a third coil configured to be coupled to the transmitter driver circuit and arranged in a third plane;
   wherein the transmitter driver circuit is configured to provide a time-varying current signal to one or more of the first coil, the second coil or the third coil;
   wherein the first coil, the second coil and the third coil are concentric;
   wherein the first plane is not parallel to the second plane and the third plane; and
   wherein the second plane is not parallel to the third plane.

2. The wireless charging system of claim 1, further comprising a fourth coil, wherein the fourth coil is configured to be coupled to a first receiver circuit, is arranged a first distance from the first coil, the second coil or the third coil and is configured to receive a power charging signal from the first coil, the second coil or the third coil.

3. The wireless charging system of claim 2, further comprising a fifth coil, wherein the fifth coil is configured to be coupled to a second receiver circuit, is arranged a second distance from the first coil, the second coil or the third coil and is configured to receive the power charging signal from the first coil, the second coil or the third coil.

4. The wireless charging system of claim 3, wherein the fourth coil or the fifth coil is configured to operate at a first resonant frequency.

5. The wireless charging system of claim 3, wherein a diameter of the first coil is substantially equal to a diameter of the fourth coil or a diameter of the fifth coil.

6. The wireless charging system of claim 1, wherein the first coil, the second coil or the third coil is configured to operate at a first resonant frequency.

7. The wireless charging system of claim 1, wherein the first coil, the second coil and the third coil are configured to generate a multi-directional magnetic field.

8. The wireless charging system of claim 1, wherein a diameter of the first coil is substantially equal to a diameter of the second coil or a diameter of the third coil.

9. A wireless charging device comprising:
a first coil configured to be coupled to a transmitter driver circuit and arranged in a first plane;
a second coil configured to be coupled to the transmitter driver circuit and arranged in a second plane; and
a third coil configured to be coupled to the transmitter driver circuit and arranged in a third plane;
wherein the transmitter driver circuit is configured to provide a time-varying current signal to one or more of the first coil, the second coil or the third coil;
wherein the first coil, the second coil and the third coil are concentric;
wherein the first plane is not parallel to the second plane and the third plane;
wherein the second plane is not parallel to the third plane;
wherein the first coil, the second coil or the third coil is configured to operate at a first resonant frequency; and
wherein the first coil, the second coil and the third coil are configured to generate a substantially omni-directional magnetic field.

10. The wireless charging device of claim 9, wherein the transmitter driver circuit comprises:
a first driver element configured to be coupled to the first coil or the second coil; and
a second driver element configured to be coupled to the first coil or the second coil, wherein the first driver element and the second driver element are configured to provide a path for the current signal.

11. The wireless charging device of claim 10, wherein the first driver element comprises:
a first N-type transistor;
a first terminal of the first N-type transistor configured as a first input node to receive a first control signal;
a second terminal of the first N-type transistor coupled to at least a source voltage; and
a third terminal of the first N-type transistor coupled to the first coil or the second coil.

12. The wireless charging device of claim 11, wherein the second driver element comprises:
a second N-type transistor;
a first terminal of the second N-type transistor configured as a second input node to receive a second control signal;
a second terminal of the second N-type transistor coupled to the first coil or the second coil; and
a third terminal of the second N-type transistor coupled to at least the source voltage.

13. The wireless charging device of claim 12, further comprising:

a capacitor;
a first terminal of the capacitor coupled to the first coil or the second coil; and
a second terminal of the capacitor coupled to the first N-type transistor or the second N-type transistor, wherein the first coil is coupled to the second coil.

14. The wireless charging device of claim 11, wherein the first driver element further comprises:
a first diode;
a first terminal of the first diode coupled to the second terminal of the first N-type transistor; and
a second terminal of the first diode coupled to the third terminal of the first N-type transistor.

15. The wireless charging device of claim 14, wherein the second driver element further comprises:
a second diode;
a first terminal of the second diode coupled to the second terminal of the second N-type transistor; and
a second terminal of the second diode coupled to the third terminal of the second N-type transistor.

16. A method of wirelessly charging an electronic device comprising:
receiving a request to send a power charging signal to at least one receiver, wherein the at least one receiver is configured to be charged by the power charging signal;
selecting at least one transmitting coil among a plurality of interconnected concentric transmitting coils; and
sending the power charging signal to the at least one receiver by the at least one selected coil.

17. The method of claim 16, wherein selecting the at least one transmitting coil comprises selecting at least a first coil and a second coil comprising:
receiving a first control signal, wherein the first control signal selectively controls a first driver element, wherein the first driver element is connected to the first coil;
receiving a second control signal, wherein the second control signal selectively controls a second driver element, wherein the second driver element is connected to the second coil; and
selectively enabling the first driver element and the second driver element.

18. The method of claim 17, wherein sending the power charging signal to the at least one receiver by the at least one selected coil comprises generating a first current signal which flows through at least the first coil and the second coil, wherein a frequency of the first current signal is substantially equal to a resonant frequency of the first coil and a resonant frequency of the second coil.

19. The method of claim 18, wherein selecting the at least one transmitting coil further comprises selecting a third coil comprising:
receiving a third control signal, wherein the third control signal selectively controls a third driver element, wherein the third driver element is connected to the third coil; and
selectively enabling the third driver element.

20. The method of claim 19, wherein sending the power charging signal to the at least one receiver by the selected coils further comprises generating a second current signal which flows through at least the third coil and either the first coil or the second coil, wherein a frequency of the second current signal is substantially equal to a resonant frequency of the third coil and either the resonant frequency of the first coil or the resonant frequency of the second coil.

* * * * *